United States Patent
Doyle et al.

(10) Patent No.: US 12,544,535 B2
(45) Date of Patent: Feb. 10, 2026

(54) CATHETER

(71) Applicant: Shelverton Holdings Pty Ltd., Queensland (AU)

(72) Inventors: Barry Doyle, Jolimont (AU); Lachlan Kelsey, Cottesloe (AU); Caroline Shelverton, Queensland (AU)

(73) Assignee: SHELVERTON HOLDINGS PTY LTD, Upper Kedron (AU)

( * ) Notice: Subject to any disclaimer, the term of this patent is extended or adjusted under 35 U.S.C. 154(b) by 123 days.

(21) Appl. No.: 17/613,928

(22) PCT Filed: May 21, 2020

(86) PCT No.: PCT/AU2020/050497
§ 371 (c)(1),
(2) Date: Nov. 23, 2021

(87) PCT Pub. No.: WO2020/237286
PCT Pub. Date: Dec. 3, 2020

(65) Prior Publication Data
US 2022/0323716 A1    Oct. 13, 2022

(30) Foreign Application Priority Data
May 24, 2019    (AU) .............................. 2019901780

(51) Int. Cl.
*A61M 25/00*    (2006.01)

(52) U.S. Cl.
CPC .... *A61M 25/0023* (2013.01); *A61M 25/0068* (2013.01); *A61M 2205/583* (2013.01)

(58) Field of Classification Search
CPC .......... A61M 25/0023; A61M 25/0068; A61M 25/007; A61M 25/0054; A61M 25/0032;
(Continued)

(56) References Cited

U.S. PATENT DOCUMENTS

| | | | |
|---|---|---|---|
| 4,966,586 A | 10/1990 | Vaillancourt | |
| 5,221,256 A | * 6/1993 | Mahurkar | ........... A61M 1/3661 604/523 |

(Continued)

FOREIGN PATENT DOCUMENTS

| | | |
|---|---|---|
| AU | 2020285468 B2 | 5/2020 |
| CA | 2769026 C | 4/2015 |

(Continued)

OTHER PUBLICATIONS

Weiss et al., "Novel Short Peripheral Catheter Design for Prevention of Thrombophlebitis", First published: Dec. 2, 2018—https://doi.org/10.1111/jth.14350.

(Continued)

*Primary Examiner* — Laura A Bouchelle
*Assistant Examiner* — Sarah Dympna Grasmeder
(74) *Attorney, Agent, or Firm* — Wood, Phillips, Katz, Clark & Mortimer

(57) ABSTRACT

A catheter for insertion into a vessel of a subject, the catheter including an elongate body extending between a proximal end configured to be attached to a hub and a distal end configured to be inserted into the vessel of the subject, the body having, a tip portion at the distal end, the tip portion having an external tapered profile and including an outlet and a lumen extending from the proximal end to the outlet. The lumen is angled to direct flow from the outlet at an angle offset from an axis of the catheter and/or at least part of the body includes a vessel contacting portion that is softer than other parts of the catheter.

20 Claims, 20 Drawing Sheets

(58) Field of Classification Search
CPC ............ A61M 25/008; A61M 25/0075; A61M 2205/583; A61M 2205/0216; A61M 2025/0073; A61M 2025/008
See application file for complete search history.

(56) References Cited

U.S. PATENT DOCUMENTS

| | | | |
|---|---|---|---|
| 5,374,245 A | 12/1994 | Mahurkar | |
| 5,919,170 A * | 7/1999 | Woessner | A61M 25/0108 604/523 |
| 5,976,103 A | 11/1999 | Martin | |
| 6,179,816 B1 | 1/2001 | Mottola et al. | |
| 6,293,958 B1 * | 9/2001 | Berry | A61M 25/0075 606/191 |
| 6,403,011 B1 | 6/2002 | Stamberg | |
| 6,533,763 B1 | 3/2003 | Schneiter | |
| 6,669,680 B1 | 12/2003 | Macoviak et al. | |
| 6,676,650 B1 | 1/2004 | Kassab et al. | |
| 6,702,788 B2 | 3/2004 | Kawakita et al. | |
| 6,808,510 B1 | 10/2004 | Diflore | |
| 6,969,379 B1 | 11/2005 | Aboul-Hosn et al. | |
| 6,999,809 B2 | 2/2006 | Currier et al. | |
| 7,029,467 B2 | 4/2006 | Currier et al. | |
| 7,314,857 B2 | 1/2008 | Madhyastha | |
| 7,641,645 B2 | 1/2010 | Schur | |
| 7,686,800 B2 | 3/2010 | Savage et al. | |
| 8,021,351 B2 | 9/2011 | Boldenow et al. | |
| 8,282,677 B2 | 10/2012 | O'Connor et al. | |
| 8,403,911 B2 | 3/2013 | Adams et al. | |
| 8,486,022 B2 | 7/2013 | Ludwig et al. | |
| 8,532,749 B1 | 9/2013 | Patton | |
| 8,617,103 B2 | 12/2013 | Vreeman | |
| 8,852,181 B2 | 10/2014 | Malecki et al. | |
| 9,399,112 B2 | 7/2016 | Shevgoor et al. | |
| 9,402,974 B2 | 8/2016 | Haider et al. | |
| 9,402,975 B2 | 8/2016 | Shevgoor | |
| 9,629,981 B2 | 4/2017 | Thungana et al. | |
| 9,789,282 B2 | 10/2017 | Mckinnon et al. | |
| 9,884,166 B2 | 2/2018 | Howle et al. | |
| 9,932,484 B2 | 4/2018 | Aizenberg et al. | |
| 10,080,838 B2 | 9/2018 | Rotman et al. | |
| 10,213,582 B2 | 2/2019 | Garrison et al. | |
| 2002/0087076 A1 | 7/2002 | Meguro et al. | |
| 2003/0191453 A1 | 10/2003 | Velez et al. | |
| 2005/0182352 A1 | 8/2005 | DiMatteo et al. | |
| 2007/0073271 A1 | 3/2007 | Brucker et al. | |
| 2007/0135795 A1 | 6/2007 | De Paulis | |
| 2007/0287956 A1 * | 12/2007 | Tal | A61M 25/1002 604/96.01 |
| 2008/0108975 A1 | 5/2008 | Appling et al. | |
| 2009/0157051 A1 | 6/2009 | Appling et al. | |
| 2009/0187152 A1 | 7/2009 | Porto et al. | |
| 2009/0264863 A1 | 10/2009 | Bloom | |
| 2010/0179513 A1 | 7/2010 | Hebeler | |
| 2011/0082444 A1 * | 4/2011 | Mayback | A61B 5/412 604/544 |
| 2011/0245800 A1 | 10/2011 | Kassab et al. | |
| 2011/0276022 A1 | 11/2011 | O'Day | |
| 2011/0313399 A1 | 12/2011 | Jacoby et al. | |
| 2012/0035585 A1 | 2/2012 | Kurrus et al. | |
| 2012/0078175 A1 * | 3/2012 | Vreeman | A61M 25/0069 604/528 |
| 2012/0239004 A1 | 9/2012 | Wong | |
| 2013/0267845 A1 * | 10/2013 | Howle | A61M 25/0068 600/432 |
| 2013/0267912 A1 | 10/2013 | Cox et al. | |
| 2015/0071982 A1 | 3/2015 | Lee et al. | |
| 2015/0174379 A1 | 6/2015 | Bagaoisan et al. | |
| 2015/0202360 A1 | 7/2015 | Chao et al. | |
| 2015/0209550 A1 | 7/2015 | Teh et al. | |
| 2015/0282821 A1 | 10/2015 | Look et al. | |
| 2017/0348512 A1 | 12/2017 | Orr et al. | |
| 2018/0008521 A1 | 1/2018 | Paik et al. | |
| 2018/0093074 A1 | 4/2018 | Burkholz et al. | |
| 2019/0030290 A1 * | 1/2019 | Ginster | A61M 25/065 |
| 2019/0160255 A1 | 5/2019 | Shelverton | |
| 2022/0323716 A1 | 10/2022 | Doyle et al. | |

FOREIGN PATENT DOCUMENTS

| | | | |
|---|---|---|---|
| CA | 2837731 C | 5/2018 | |
| CN | 101056667 A | 10/2007 | |
| CN | 101374566 A | 2/2009 | |
| CN | 104203330 A | 12/2014 | |
| CN | 104284685 A | 1/2015 | |
| CN | 104379208 A | 2/2015 | |
| CN | 105496507 A | 4/2016 | |
| CN | 104436417 | 1/2018 | |
| CN | 107913445 A | 4/2018 | |
| CN | 109715241 A | 5/2019 | |
| EP | 854740 B1 | 7/1998 | |
| EP | 1476213 B1 | 8/2006 | |
| EP | 3391927 A2 | 10/2018 | |
| EP | 3135332 A1 | 5/2021 | |
| EP | 3976158 A1 | 4/2022 | |
| JP | 03631807 B2 | 3/2005 | |
| JP | 2008036157 A | 2/2008 | |
| JP | 04698915 | 6/2011 | |
| JP | 05111767 B2 | 1/2013 | |
| JP | 2013013654 A | 1/2013 | |
| WO | 1998050097 A1 | 11/1998 | |
| WO | 2000010631 A1 | 3/2000 | |
| WO | 2012007944 A1 | 1/2012 | |
| WO | 2012009187 A1 | 1/2012 | |
| WO | 2013103864 A1 | 7/2013 | |
| WO | 2015077560 A1 | 5/2015 | |
| WO | 2015111680 A1 | 7/2015 | |
| WO | 2017053310 A1 | 3/2017 | |
| WO | 2017053663 A1 | 3/2017 | |
| WO | 2017074674 A1 | 5/2017 | |
| WO | 2017200750 A1 | 5/2017 | |
| WO | 2018031710 A1 | 2/2018 | |
| WO | WO-2018018093 A1 * | 2/2018 | A61M 1/008 |
| WO | 2018051926 A1 | 3/2018 | |
| WO | 2018081264 A1 | 5/2018 | |
| WO | 2018158636 A1 | 9/2018 | |
| WO | 2018187577 A2 | 10/2018 | |
| WO | 2019003425 A1 | 1/2019 | |
| WO | 2020/237286 A1 | 12/2020 | |

OTHER PUBLICATIONS

MacCallum, N. et al., Liquid-Infused Silicone as a Biofouling-Free Medical Material, ACS Biomaterials Science and Engineering, 2015, vol. 1(1), p. 43-51.
International Search Report for corresponding PCT Application No. PCT/AU2020/050497 mailed Jul. 24, 2020.
Office Action in corresponding Canadian Application No. 3,140,215 mailed Dec. 16, 2022.
Extended European Search Report in corresponding Application No. 20812617.7 mailed Jun. 2, 2023.
Office Action in corresponding Canadian Application No. 3,140,216 mailed May 25, 2023.
Canadian Office Action for Canadian Application No. 3,140,215, mailed Jan. 9, 2024.
Chinese Office Action for Chinese Application No. 202080038717. 9, mailed Jan. 15, 2024.

* cited by examiner

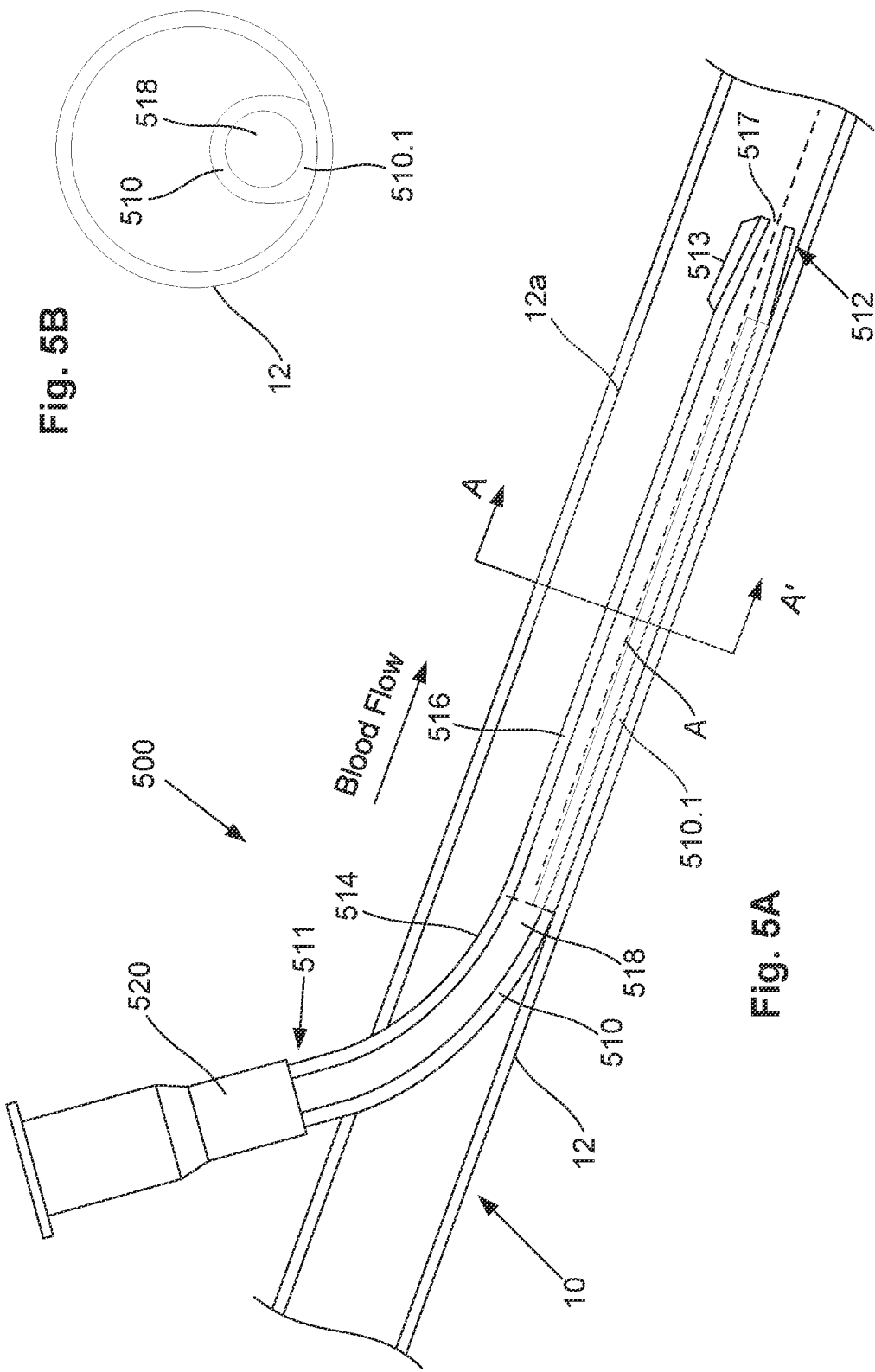

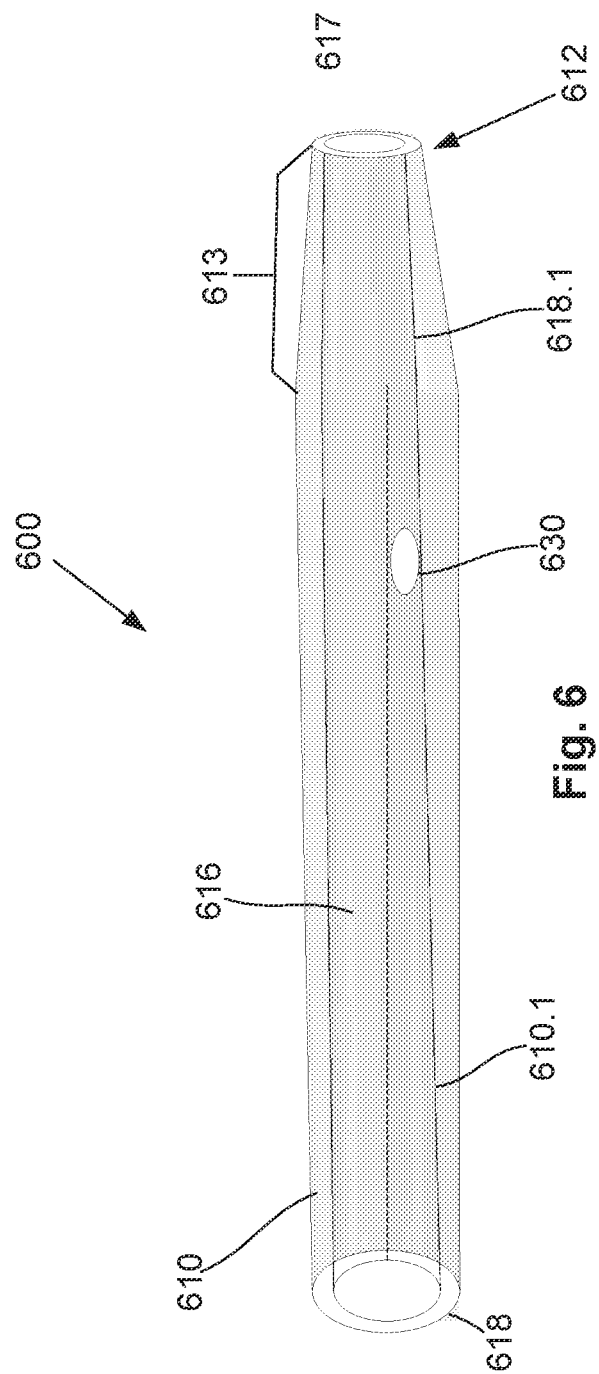

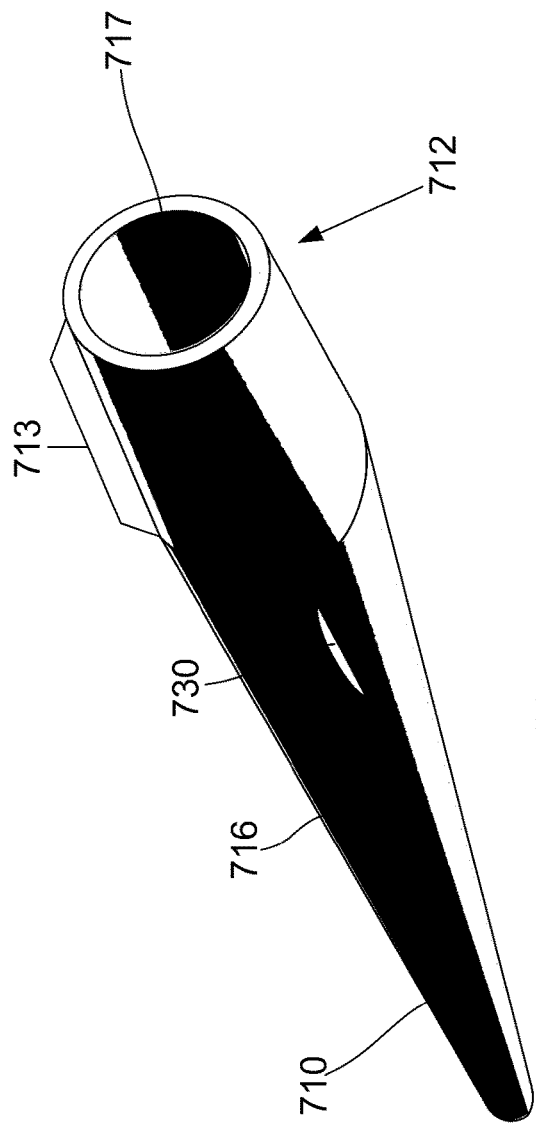
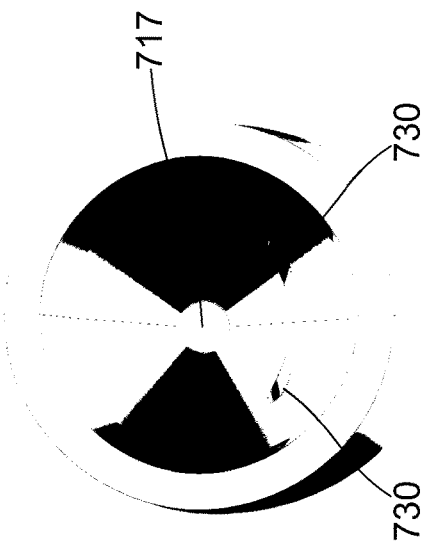
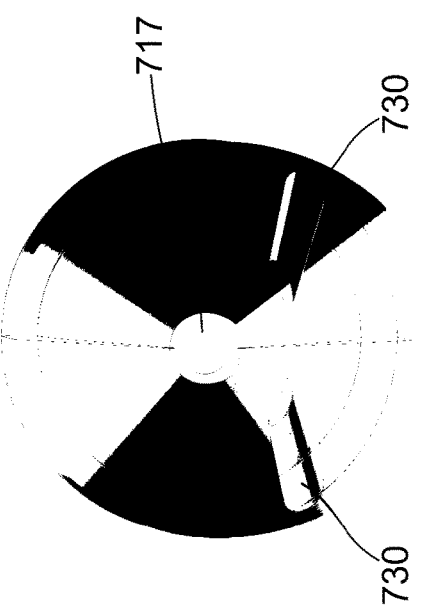
Fig. 7A
Fig. 7B
Fig. 7C

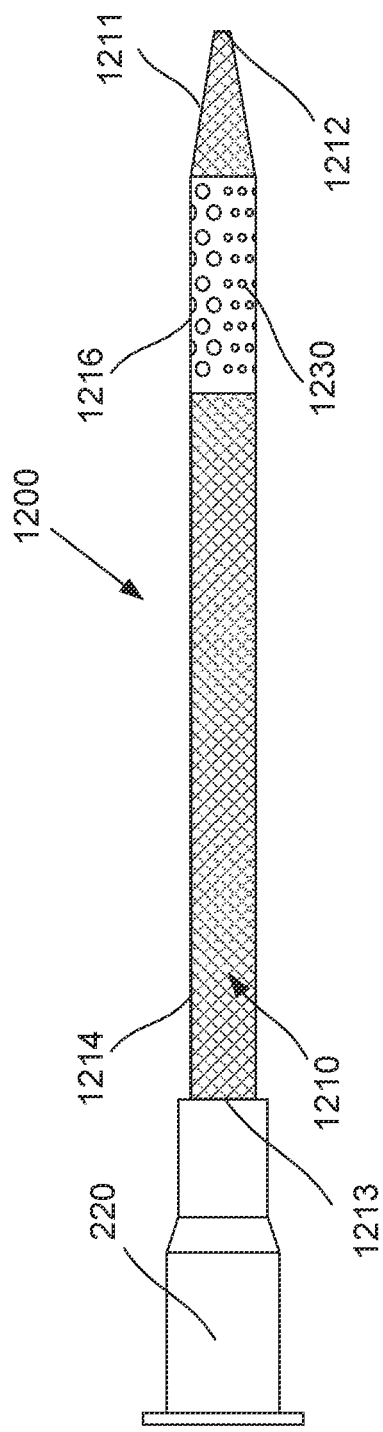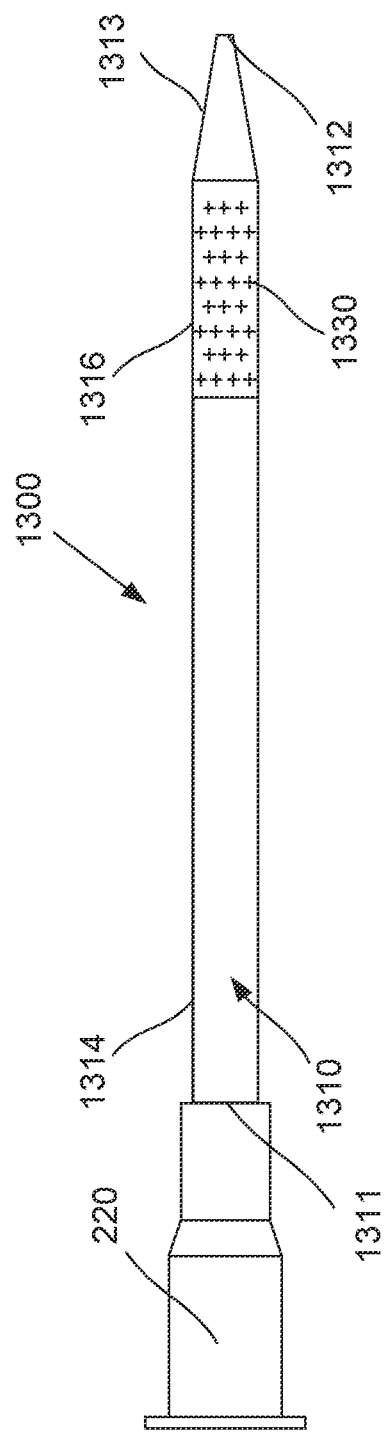

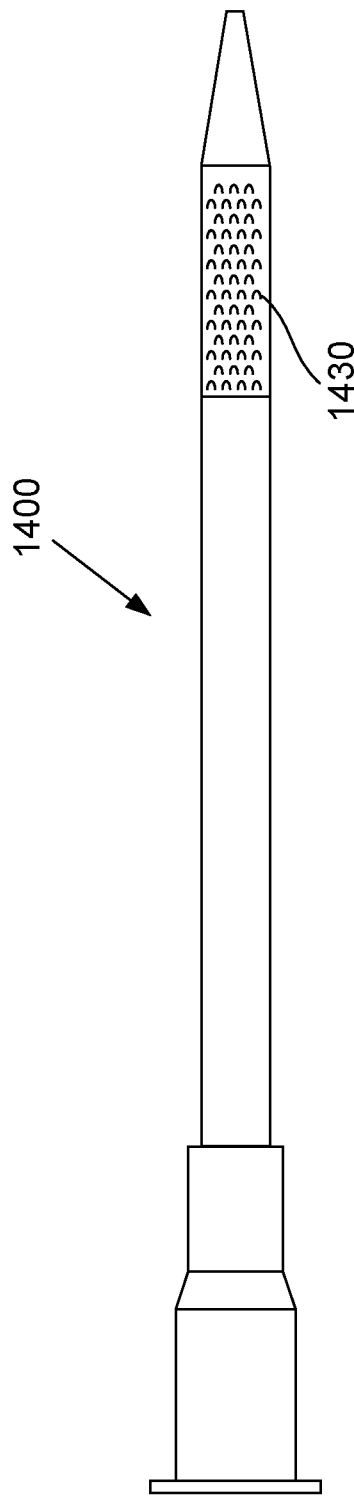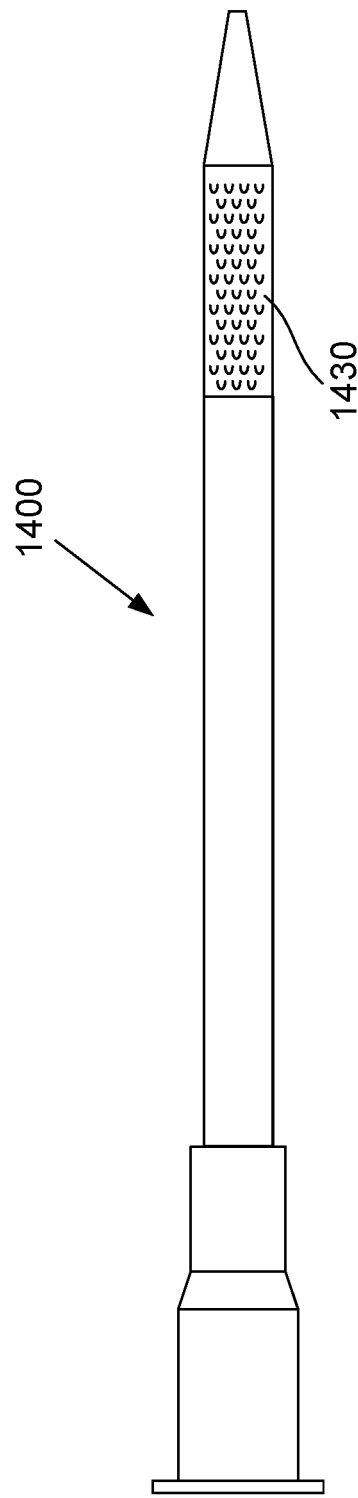
Fig. 14A
Fig. 14B

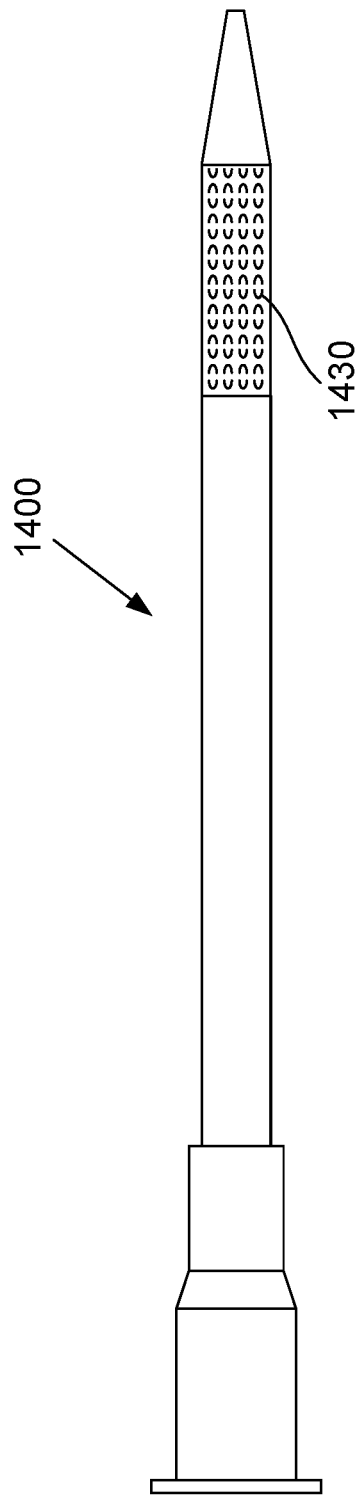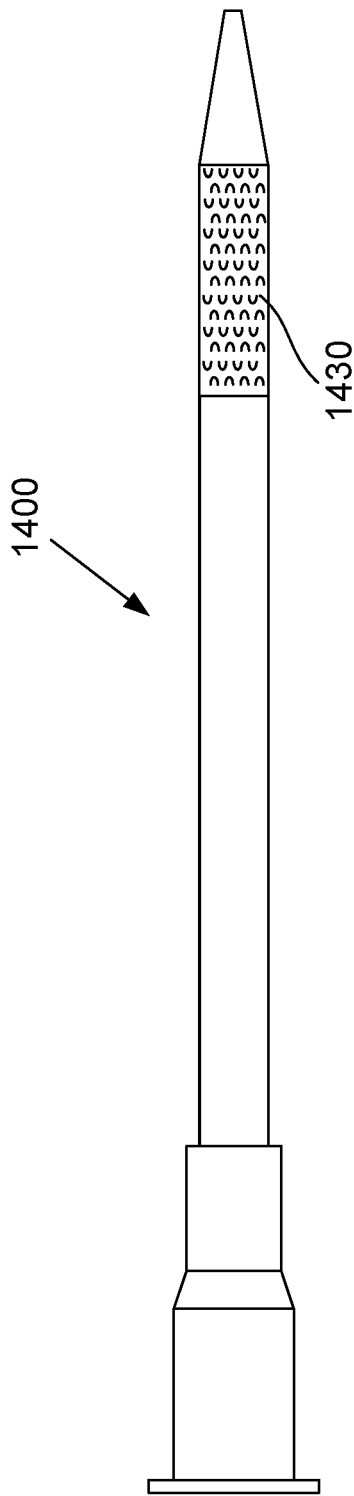
Fig. 14C
Fig. 14D

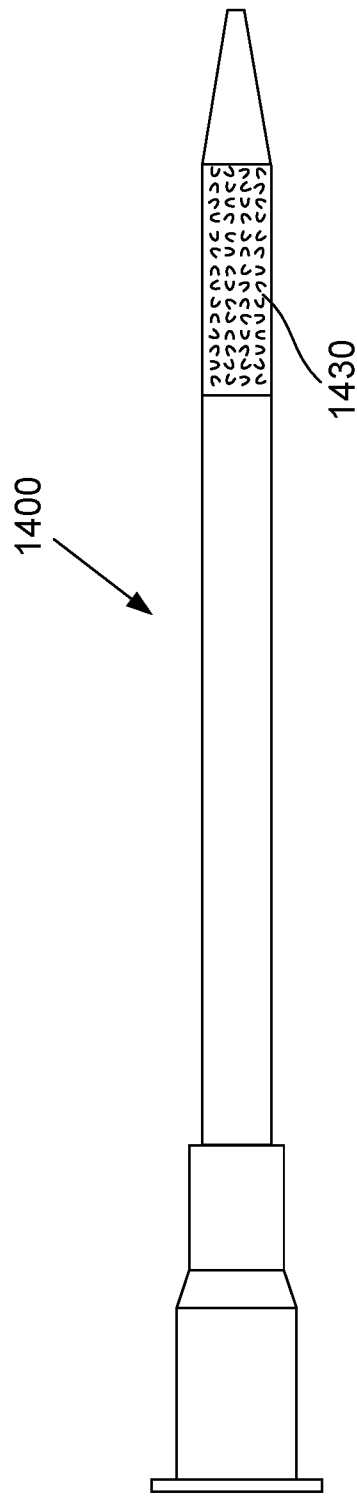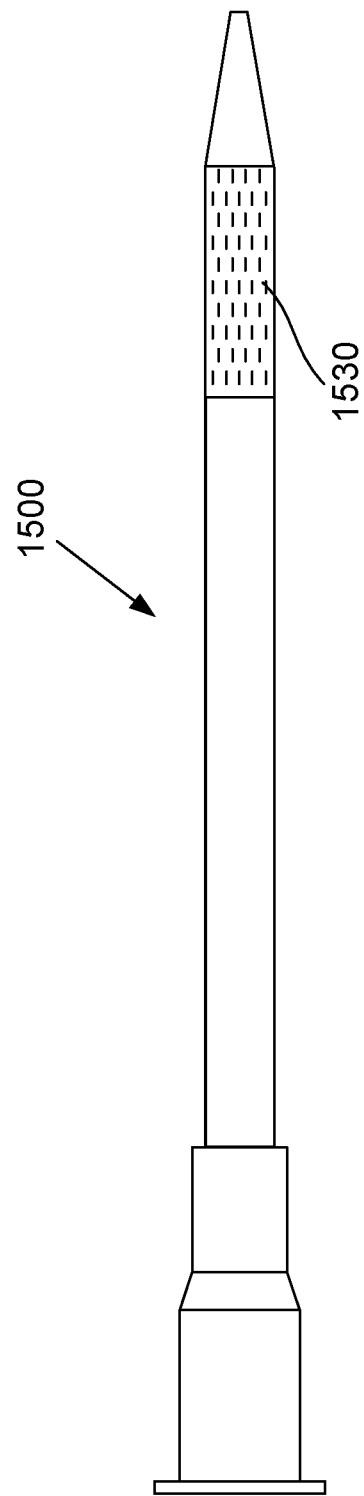
Fig. 14E
Fig. 15

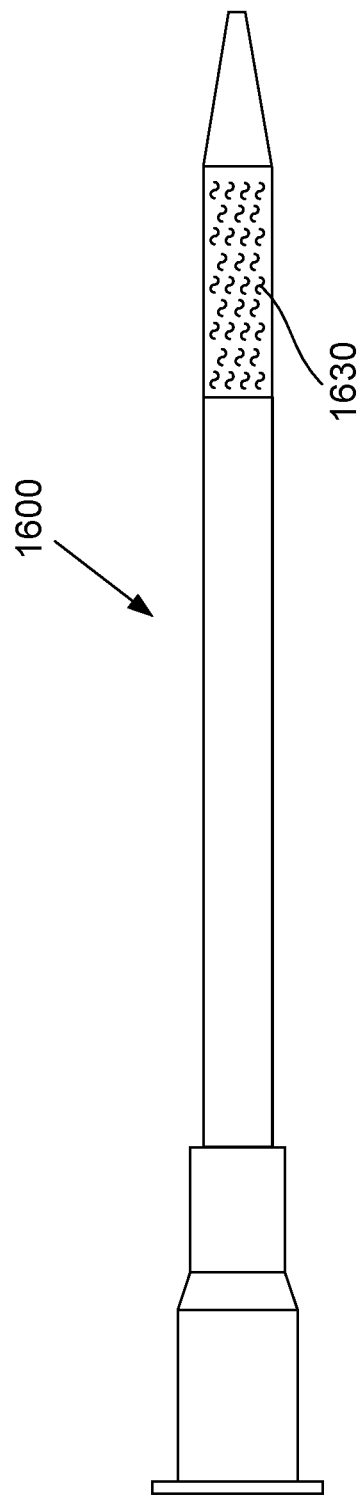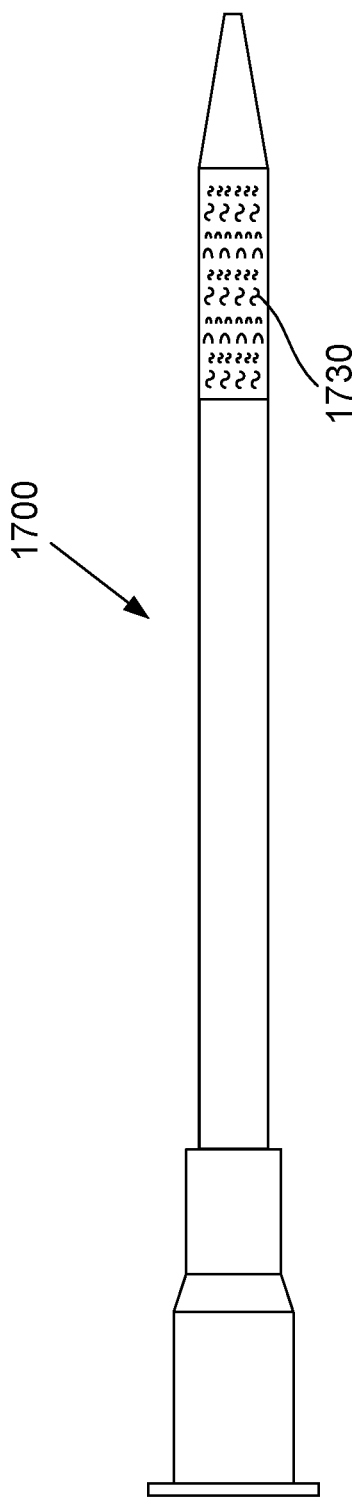
Fig. 16
Fig. 17

CATHETER

BACKGROUND OF THE INVENTION

The present invention relates to catheters, and in one example to a peripheral intra-venous catheter (PIVC) or midline catheter used for administering intravenous fluids, blood products and medications to a patient or aspirating blood or fluid for sampling. In another example, the invention relates to an arterial catheter used for haemodynamic monitoring and aspiration for blood sampling.

Description of the Prior Art

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

A peripheral intra-venous catheter (PIVC) or arterial catheter or line ('a-line') is a vital tool in the delivery of patient care within a hospital or care facility. PIVCs are used by 70% of patients admitted to hospitals to administer intra-venous (IV) medicaments, fluids, nutrition and blood products and can be lifesaving. Arterial catheters are commonly used for haemodynamic monitoring and aspiration for blood sampling.

Traditional PIVCs and a-lines include a hollow tube typically made from a polymer such as polyurethane that is peripherally inserted into a vessel of a patient. The catheter tube typically has a smooth hydrophobic surface and a single lumen that terminates in a tip portion having a fluid outlet.

Currently, up to 30-40% of PIVCs fail for reasons due to occlusion, phlebitis, infiltration, infection and dislodgement while up to 35% of peripheral arterial lines fail for reasons due to fibrin formation and micro-aggregation of blood components which leads to thrombus. An essential requirement of a-lines is patency to allow adequate haemodynamic monitoring.

An example of a prior art catheter 100 (PIVC or a-line) for insertion into a vessel 10 of a patient is illustrated in FIG. 1, in which the catheter 100 is shown in situ within the vessel 10 (which may be a vein or artery).

In this example, the catheter 100 includes an open tube 110 extending between a proximate end 111 attached to a hub 120 and a distal end 112 that defines an opening that permits fluid 2 to flow into/out of the tube 110.

The tube 110 defines a single lumen and includes a short externally tapered tip portion 113 that terminates at the opening of the distal end 112. The diameter of the distal opening 112 at the tip 113 is typically the same diameter as the tube 110. The catheter 100 can be used to administer a fluid into the vessel 10 of the patient or for aspirating or drawing blood for sampling.

The drawbacks of this traditional prior art catheter shall now be described in further detail.

A first problem resides in the potential for interference between the catheter 100 and tip 113, and the vessel wall 12. Typically, in use, the catheter 100 and tip 113 will contact or drag against portion A of the inner layer of the vessel wall 12 known as the tunica intima 12a. Lining this tunica intima is a layer of sensitive endothelial cells (endothelium). This may cause damage to the vessel wall including erosion of the endothelium and tunica intima 12a through friction which can in turn lead to phlebitis or infiltration. Phlebitis relates to inflammation or irritation of the walls of the vessel whilst infiltration concerns the potential for the catheter to penetrate or pierce through the vessel wall entirely.

Phlebitis may also result from the fact that the fluid outflow is typically concentrated on a small area of the vessel wall. The force of the fluid ejecting from the tip 113 onto the vessel wall 12a causes shear stress. Shear stress damages endothelial cells and leads to phlebitis (inflammation). Irritants such as IV medications that continuously exit the catheter onto the tunica intima in the same position may also lead to inflammation.

Traditional single lumen catheters of the type shown in FIG. 1 are also prone to thrombotic occlusion whereby a thrombus forms within, surrounding or at the tip of the catheter, thereby blocking fluid flow into/out of the catheter. Occlusion may also result during aspiration of blood or fluids using a traditional single lumen catheter. The combination of proximity of the catheter tip to the tunica intima and negative pressure whilst aspirating may create a suction-like effect leading to a ball-valve occlusion at the catheter tip.

Peripheral arterial catheters used for example in haemodynamic monitoring may also become partially occluded by fibrin formation and micro thrombi.

Prior art catheters also generally have a smooth hydrophobic surface which attracts biofilm that can lead to microbial infection, particularly if the biofilm is dislodged and enters the bloodstream.

A final drawback of existing PIVC and arterial catheters relates to the shear force exerted on the vessel walls as a result of outflow being directed onto the vessel inner wall 12a which may lead to wall damage or irritation. Typically, as a fluid is injected into a catheter from a pre-filled syringe the inflow pressure is constant.

It is against this background, and the problems and difficulties associated therewith, that the present invention has been developed.

SUMMARY OF THE PRESENT INVENTION

In one broad form, an aspect of the present invention seeks to provide a catheter for insertion into a vessel of a subject, the catheter including: an elongate body extending between a proximal end configured to be attached to a hub and a distal end configured to be inserted into the vessel of the subject, the body having: a tip portion at the distal end, the tip portion having an external tapered profile and including an outlet; and, a lumen extending from the proximal end to the outlet, wherein at least one of: the lumen is angled to direct flow from the outlet at an angle offset from an axis of the catheter; and, at least part of the body includes a vessel contacting portion that is softer than other parts of the catheter.

In one embodiment the lumen is angled at least one of: asymmetrically; so that a wall of the lumen on opposing sides of the tip portion is angled differentially; so that a wall on one side of the tip portion is substantially aligned with the lumen in the elongate body and the wall on an opposing side of the tip portion is angled relative to the lumen in the elongate body; in the tip portion; in at least part of the body; so that the lumen narrows towards the outlet; and, with a curved profile.

In one embodiment the lumen in the tip portion is provided at an angle relative to the axis of the catheter that is at least one of: greater than 1°; greater than 2°; greater than 5°; greater than 10°; less than 15°; and, less than 20°.

In one embodiment the external tapered profile is at least one of: asymmetric; at an angle offset from an axis of the catheter; and, so that the outlet is offset from an axis of the catheter.

In one embodiment the angle of the lumen is configured to: direct flow from the outlet at an angle offset from the axis of the catheter; direct flow towards a centre of the vessel; and, direct flow away from a vessel wall.

In one embodiment the vessel contacting portion is configured to at least one of: at least partially deform upon contact with the vessel; and, distribute load across a surface of the vessel.

In one embodiment the vessel contacting portion is at least one of: made of a different material to other parts of the body; and, a surface layer applied to at least part of the body.

In one embodiment the vessel contacting portion is made of polyurethane.

In one embodiment the vessel contacting portion has a Shore hardness of at least one of: less than 50 A; less than 40 A; less than 30 A; less than 20 A; and, less than 10 A.

In one embodiment a non vessel contacting portion has a Shore hardness of at least one of: greater than 50 A; greater than 40 A; greater than 30 A; greater than 20 A; and, greater than 10 A.

In one embodiment the ratio of the hardness of the non vessel contacting portion to the vessel contacting portion is at least one of: greater than 0.01:1; greater than 0.05:1; greater than 0.1:1; and greater than 0.5:1.

In one embodiment the vessel contacting portion is provided at least one of: on an underside of the body; and, rearwardly of the tip portion.

In one embodiment the body includes: a first portion that extends a first length from the proximal end; a second portion that extends a second length from an end of the first portion to the tip portion, and wherein the second portion includes the vessel contacting portion.

In one embodiment the second portion has a length that is at least one of: at least 30% of the catheter length; at least 40% of the catheter length; at least 50% of the catheter length; at least 60% of the catheter length; and, at least 65% of the catheter length.

In one embodiment the body includes at least one opening extending through the body.

In one embodiment the at least one opening is configured to permit fluid flow into or out of the body.

In one embodiment the at least one opening is provided on a side of the body containing the vessel contacting portion.

In one embodiment the at least one opening is configured to cause fluid exiting the at least one opening to enter a region between the vessel and the vessel contacting portion, to thereby at least one of: assist in cushioning the vessel wall; and reduce stagnation of blood flow in a region adjacent the catheter.

In one embodiment the at least one opening is provided on a side of the body opposing a side containing the vessel contacting portion.

In one embodiment the at least one opening is configured to cause fluid exiting the at least one opening to be directed at least one of: towards a centre of the vessel; and, away from a vessel wall.

In one embodiment the at least one opening is configured to direct fluid exiting the catheter via the opening in a direction substantially parallel to a direction of blood flow within the blood vessel.

In one embodiment the at least one opening is provided rearwardly of the tip portion.

In one embodiment the body includes: a first portion that extends a first length from the proximal end; a second portion that extends a second length from an end of the first portion to the tip portion, and wherein the second portion includes at least one opening extending through the body.

In one embodiment the second portion is configured to be wholly positioned within the vessel in use.

In one embodiment the at least one opening is a self-occluding opening, operable between a resting-closed position and a forced-open position.

In one embodiment the plurality of self-occluding openings are at least one of: cross-shaped slits; U-shaped slits; I-shaped slits; curved slits.

In one embodiment the plurality of self-occluding openings are in a forced-open position when at least one of: an internal pressure is larger than an external pressure; and, an external pressure is larger than an internal pressure.

In one embodiment the catheter body is made of at least one of: a flexible material; fluorinated ethylene propylene (FEP); polytetrafluoroethene (PTFE); silicone; and, polyurethane.

In one embodiment the tip tapers to a narrower distal end.

In one embodiment the narrow distal end has a diameter that is at least one of: less than 90% of a diameter of the body; less than 80% of a diameter of the body; less than 50% of a diameter of the body; between 40% to 10% of a diameter of the body; approximately 30% of a diameter of the body; and, approximately 20% of a diameter of the body.

In one embodiment the catheter includes features configured to assist orientation of the catheter within the vessel.

In one embodiment a proximal end of the catheter is coupled to a hub and the features are used to control an orientation of the catheter relative to a hub.

In one embodiment the features include visual markings at least one of: provided proximate a proximal end; and, provided on the first portion, wherein the visual markings are indicative of at least one of: a side of the catheter that should contact the vessel; a side of the catheter that should face away from the vessel; a position of the vessel contacting portion; a direction of the angle of the lumen.

In one broad form, an aspect of the present invention seeks to provide a catheter for insertion into a vessel of a patient, the catheter including an elongate body extending between a proximal end for attachment to a hub and a distal end at a tip portion thereof, the body having a circumferential wall and including a first portion that extends a first length from the proximal end and defines an enclosed section of the wall and a second portion that extends a second length from an end of the first portion towards the tip portion, the second portion defining an at least partially open section of the wall having a plurality of self-occluding openings arranged to permit fluid flow into or out of the second portion of the body, wherein the self-occluding opening is operable between a resting-closed position and a forced-open position.

In one embodiment the tip tapers to a narrower distal end.

In one embodiment the narrow distal end has a diameter that is at least one of: less than 90% of a diameter of the body; less than 80% of a diameter of the body; less than 50% of a diameter of the body; between 40% to 10% of a diameter of the body; approximately 30% of a diameter of the body; and, approximately 20% of a diameter of the body.

In one embodiment the plurality of self-occluding openings are at least one of: cross-shaped slits; V-shaped slits; U-shaped slits; I-shaped slits; curved slits.

In one embodiment the second portion is made of at least one of: a flexible material; fluorinated ethylene propylene (FEP); polytetrafluoroethene (PTFE); silicone; and, polyurethane.

In one embodiment the plurality of self-occluding openings are in a forced-open position when at least one of: an internal pressure is larger than an external pressure; and, an external pressure is larger than an internal pressure.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:

FIG. 5A is a schematic side view of a further example of a catheter inserted into a vessel and used to deliver a fluid into the bloodstream;

FIG. 5B is a schematic sectional view taken through line A-A' of FIG. 5A showing fluid outflow from the catheter into the vessel;

FIG. 6 is a schematic side view of a further example of a catheter;

FIG. 7A is a schematic side perspective view of a further example of a catheter;

FIG. 7B is a schematic end view of the catheter of FIG. 7A;

FIG. 7C is a schematic internal end view of the catheter of FIG. 7A;

FIG. 12 is a schematic side view of a sixth example of a catheter for insertion into a vessel of a patient;

FIG. 13 is a schematic side view of a seventh example of a catheter for insertion into a vessel of a patient;

FIGS. 14A to 14E are schematic side views of an eighth example of a catheter for insertion into a vessel of a patient;

FIG. 15 is a schematic side view of a ninth example of a catheter for insertion into a vessel of a patient;

FIG. 16 is a schematic side view of a tenth example of a catheter for insertion into a vessel of a patient;

FIG. 17 is a schematic side view of an eleventh example of a catheter for insertion into a vessel of a patient.

DETAILED DESCRIPTION OF THE PREFERRED EMBODIMENTS

Figure 1:
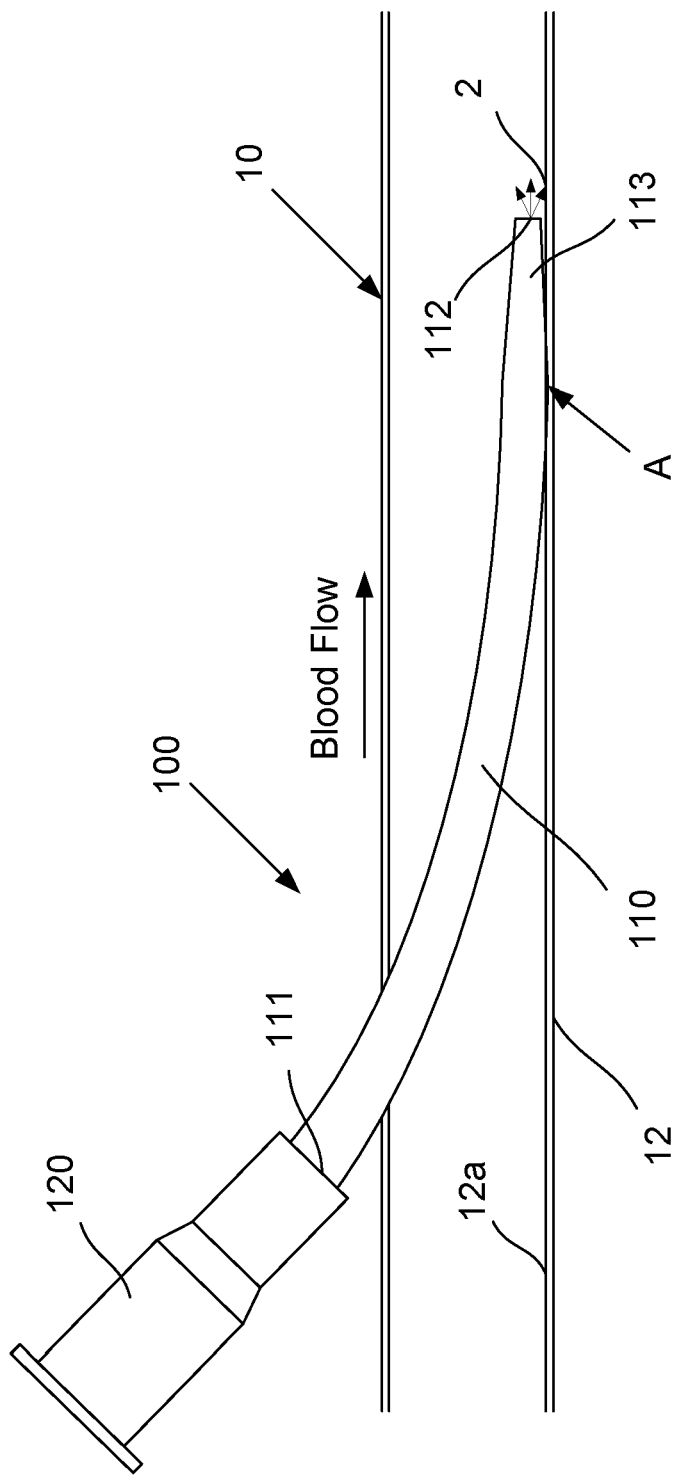
FIG. 1 is a schematic side view of a prior art catheter located in situ within a vessel of a patient.

An example of a catheter 200 for insertion into a vessel of a patient will now be described with reference to FIG. 2.

It is to be understood that as used herein, the term catheter refers to a range of medical devices for insertion into vessels of patients including peripheral intra-venous catheters (PIVC) or midline catheters used for delivering intra-venous (IV) fluids to a patient such as medicaments, nutrition and the like or aspirating blood or fluids for sampling, arterial catheters used for aspiration of blood and haemodynamic monitoring, and other types of catheters such as a renal arteriovenous fistula (AVF) catheters, central venous catheters, or the like.

A midline catheter (typically 7.5 cm to 20 cm in length) is inserted near the antecubital fossa into the basilic, cephalic, or brachial veins. The catheter tip is advanced no further than the distal axillary vein in the upper arm.

In this example, the catheter 200 includes an elongate body 210 extending between a proximal end 211 for attachment to a hub 220 and a distal end 212 at a tip portion 213 thereof, the body 210 having a circumferential wall 215 and including a first portion 214 that extends a first length L1 from the proximal end 211 and defines an enclosed section of the wall and a second portion 216 that extends a second length L2 from an end of the first portion 214 towards the tip portion 213, the second portion 216 defining an at least partially open section of the wall 215 having a plurality of openings 230 arranged to permit fluid flow into and out of the second portion 216 of the body 210.

The above described arrangement provides a number of advantages.

By providing a plurality of openings in the circumferential wall in a portion of the catheter, fluid is allowed to enter/exit the catheter at multiple positions around the circumference in addition to the fluid outlet provided at the distal end of the catheter. Fluid outflow is therefore not concentrated at a single point on the tunica intima of the vessel wall thereby minimising the likelihood of inflammation or phlebitis. Furthermore, as fluid is able to exit the catheter around the circumference of the body, in at least some examples during a flush procedure the forces acting on the catheter body may result in the catheter being substantially centralised within the vessel ensuring that the body is spaced from the tunica intima to thereby prevent drag and minimise the likelihood of tissue damage or erosion and infiltration of the vessel wall.

Thrombotic occlusion at the tip of the catheter is also eliminated due to the plurality of alternative fluid entry/exit points in the body of the catheter in addition to the fluid outlet at the tip. The above described arrangement is therefore particularly suitable for use in conjunction with keep vein open (TKVO) protocols and/or intermittent flushing. Ball-valve occlusion whilst aspirating is also eliminated as fluid is able to enter the catheter via the plurality of openings while bypassing the fluid inlet/outlet at the tip.

The plurality of openings in the body of the catheter further act to reduce the surface area of the body which reduces the area upon which biofilm is able to form. Furthermore, the openings in the body provide an alternative conduit for fluid flow leading to a reduction in the outflow shear stress exerted on the vessel walls at the distal outflow region 212 whilst also reducing the risk of dislodgement of biofilm into the bloodstream. A reduction in shear stress is beneficial as it limits irritation of the vessel wall and any potential inflammatory response.

A further benefit resides in the reduction of outflow or inflow resistance as a result of providing multiple fluid entry/exit points in the body of the catheter, which improves transmission of pulsatile arterial waveform.

It will be apparent from the above and the remaining description that centralisation of the catheter is not essential, and in some embodiments, it might be desirable for the catheter to contact the vessel wall. Nevertheless the openings can still provide benefits, such as providing alternative fluid entry/exit points or the like.

It will also be noted that the above described arrangement includes openings 230.1 in the tip region 213. However, the inclusion of openings 230.1 in the tip region 213 is not essential, and in some circumstances it is preferred to only including openings in a second portion 216, rearwardly of the tip portion 213.

A number of further features shall now be described.

In one example, the plurality of openings are arranged in a matrix or web-like formation. In such an arrangement, the circumferential wall of the second portion of the catheter body may be formed in a web, mesh or lattice like structure that provides high rigidity ensuring the structural integrity of the wall whilst maximising the reduction in surface area of the wall which leads to reduced biofilm build-up. The matrix structure may have a wave-like pattern that regularly repeats promoting uniform fluid inflow/outflow about the circumference of the catheter body. The matrix or web structure is typically a fine mesh to ensure that an introducer needle cannot easily protrude through any of the plurality of openings.

In another example, the plurality of openings are elliptically shaped and extend in a direction of elongation of the body. The plurality of openings may include openings having substantially the same length or openings having varying length. The elliptical openings may help to reduce the surface area of the second portion of the body.

In other examples, the plurality of openings may have different sizes depending on their position on the second portion. For instance, the plurality of openings may include a first arrangement of openings on a first side of the second portion and a second arrangement of openings on an opposing second side of the second portion, the openings on the first side being larger than the openings on the second side. In some examples, a diameter of the openings on the first side may be between 1.5 and 2 times a diameter of the openings on the second side.

The plurality of openings may reduce the surface area of the second portion of the body by between 30-40%, 40-50%, 50-60%, 60-70% and 70-80%. More specifically, the surface area may be reduced by between 30-35%, 35-40%, 40-45%, 45-50%, 50-55%, 55-60%, 60-65%, 65-70%, 70-75% and 75-80%.

In one example, the ratio of the first length to the second length is approximately in the range 0.5 to 2. In other words, the first length is approximately between one third and two thirds of the total length of the catheter and the second length is approximately two thirds to one third of the total length. This configuration allows for variation in the first length to suit variable patient build and vessel depth. In addition, this also ensures that the plurality of openings are provided over a substantial portion of the body whilst maintaining an enclosed solid portion that extends from the proximal end of the body so that backtracking of fluid out of the catheter is prevented.

In one example, the second portion includes the tip portion, however this is not essential and the tip portion may have an enclosed circumferential wall or alternatively may have separate openings to the arrangement of openings provided in the second portion. In one preferred example, the second portion is provided rearwardly of the tip region, in which case openings in the tip region may be omitted.

Typically, the circumferential wall defines an inner surface and an outer surface and at least a portion of at least one of the inner and outer surface is textured or roughened so as to reduce biofilm adhesion to the body in use. Any suitable form of micro-texture or surface roughness may be applied so as to reduce the smoothness of the polymer surface of the body. In some examples, a surface of the tip portion may be textured or roughened in a similar manner.

In some examples, an antibacterial coating is applied to at least a portion of the circumferential wall to reduce biofilm adhesion. A suitable coating may be an oil-infused polydimethylsiloxane (iPDMS).

Typically in use, when the catheter is inserted into the vessel and fluid outflow is at a constant rate, forces acting on the body may cause a spacing to be maintained between the body and an internal wall of the vessel. In one example, at least a portion of the body is substantially centralized within the vessel. In effect, a 'fluid cushion' is provided between the catheter body and the vessel wall thereby preventing the catheter tip from dragging on the tunica intima and causing damage thereto. Tissue erosion and irritation is thereby avoided reducing the likelihood of phlebitis and infiltration. However, this is not essential and in other examples, the catheter can be configured to contact the vessel wall in use.

In another broad form there is provided a catheter for insertion into a vessel of a patient, the catheter including an elongate body extending between a proximal end for attachment to a hub and a distal end at a tip portion thereof, the body having a circumferential wall and including a portion defining an at least partially open section of the wall having a plurality of openings arranged to permit outflow of fluid from the body into the vessel such that in use, when the catheter is inserted into the vessel and fluid outflow is at a constant rate, forces acting on the body are such that a spacing is maintained between the body and an internal wall of the vessel.

In yet a further broad form, there is provided a catheter assembly, including a catheter tube for insertion into a vessel of a patient, the catheter tube having an elongate body extending between a proximal end and a distal end at a tip portion thereof, the body having a circumferential wall and including a first portion that extends a first length from the proximal end and defines an enclosed section of the wall and a second portion that extends a second length from an end of the first portion towards the tip portion, the second portion defining an at least partially open section of the wall having a plurality of openings arranged to permit fluid flow into and out of the second portion of the body. The assembly further includes a hub attached to the proximal end of the catheter tube; and an introducer needle inserted through the catheter tube having an edge that projects beyond the distal end of the tube for penetrating a wall of the vessel.

Typically, the catheter assembly further includes a guidewire that extends through a lumen of the introducer needle for use in guiding the catheter tube into the vessel. This enables correct placement of the catheter within the vessel using a modified Seldinger technique. Alternatively, a guidewire may be introduced into the vessel through a separate catheter using the traditional Seldinger technique.

Figure 2:
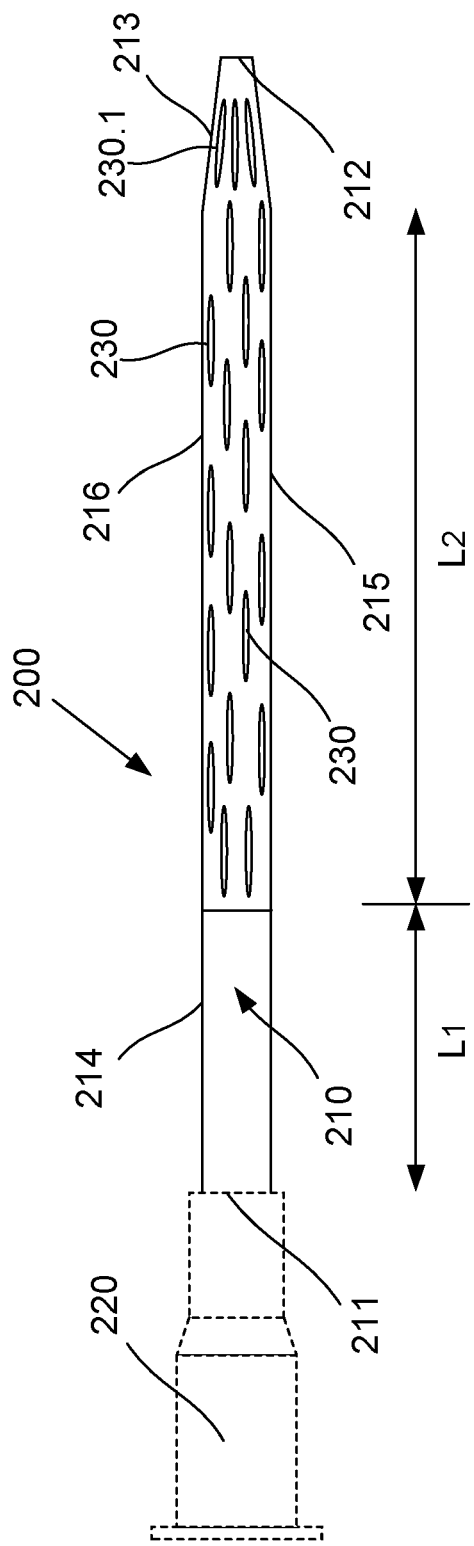
FIG. 2 is a schematic side view of a first example of a catheter for insertion into a vessel of a patient.

In the example illustrated in FIG. 2, the plurality of openings are elliptically shaped and substantially the same length whilst the length $L_1$ is approximately a third of the total length of the body and length $L_2$ is approximately two thirds the total length of the body.

Figure 3:
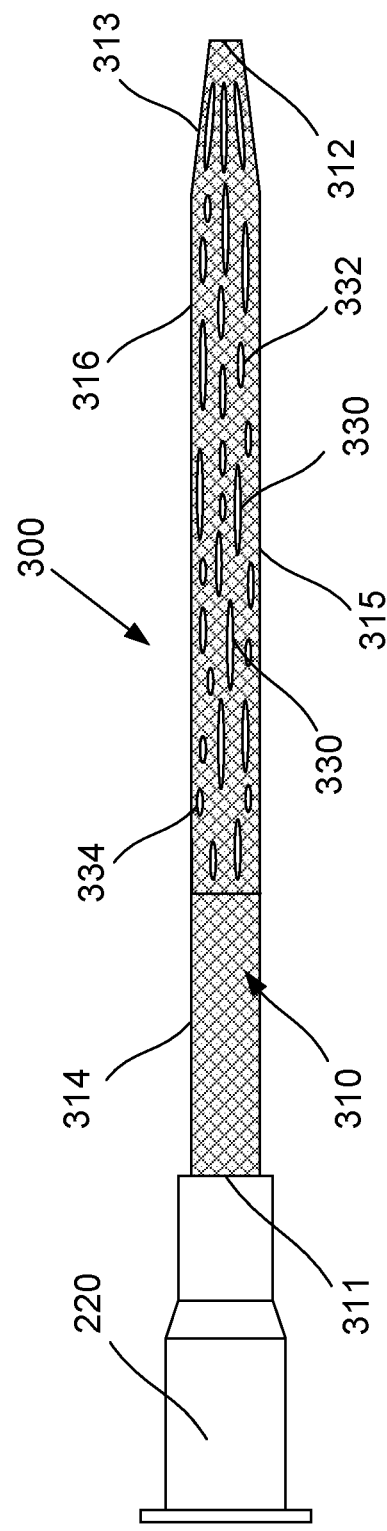
FIG. 3 is a schematic side view of a second example of a catheter for insertion into a vessel of a patient.

A second example of a catheter 300 for inserting into a vessel of a patient will now be described with reference to FIG. 3. The catheter 300 includes an elongate body 310 that extends from a proximate end 311 connectable to a hub 220 to a distal end 312 at which a fluid outlet is provided in a tip portion 313 thereof. The body 310 includes a first portion 314 that is an enclosed section and a second portion 316 that defines an at least partially open section having a plurality of openings 330, 332, 334 in a circumferential wall portion 315 thereof. In this example, the plurality of openings 330, 332, 334 are elliptically shaped and configured to extend in a direction of elongation of the body 310 and include openings of varying length.

In this example, at least one of the inner and/or outer surfaces of the circumferential wall 315 of the body 310 is textured or roughened (denoted by the cross-hatching) so as to reduce biofilm adherence to the body.

In another example, a catheter for insertion into a vessel of a subject includes a lumen that is angled to direct flow from an outlet at an angle offset from an axis of the catheter. An example of such an arrangement will now be described with reference to FIG. 4.

In this example, the catheter 400 includes an elongate body 410 extending between a proximal end 411 configured to be attached to a hub 420 and a distal end 412 configured to be inserted into the vessel of the subject. The body further includes a tip portion 413 at the distal end 412, the tip portion having an internal and external tapered profile and including an outlet 417. A lumen 418 extends from the proximal end 411 to the outlet 417.

In this example, the lumen 418 is angled in at least the tip portion 413 so as to direct fluid flow from the outlet 417 at an angle offset from an axis A of the catheter, as shown by the arrow F. Specifically, in one example, the angled portion of the lumen defines a ramp 418.1, which is at a greater angle than an internal taper of the lumen on an opposite side of the catheter. In this arrangement, the catheter 400 can be provided in contact with the blood vessel wall 12 with the ramp 418.1 orientated to direct fluid exiting the catheter away from the vessel wall 12, towards a centre of the blood vessel. This reduces fluid pressure and hence stress, and in particular shear stress, on the vessel wall, thereby helping reduce inflammation or irritation of the walls of the vessel.

It will therefore be appreciated that in this example, by virtue of directing outflow, this allows the catheter to be in contact with the vessel wall, whilst still obtaining benefits of reducing stress on the vessel wall.

A number of further features of the angled lumen will now be described.

The angled portion of the lumen could be provided solely in the tip portion 413 of the catheter body 410, which includes a tapered outer profile, but may additionally extend into at least part of the body 410 rearward of the tip portion, depending on the preferred implementation.

The angle could be defined as part of a tapering of the lumen, which allows the lumen to narrow towards the outlet 417, which can assist in maintaining a fluid pressure in the lumen. In one example, the lumen is angled asymmetrically, which can help ensure fluid is directed towards the centre of the blood vessel, and in one example results in the outlet 417 being offset from and optionally angled with respect to the axis A. However, this is not essential and other configurations could be used.

In one example, a wall of the lumen on opposing sides of the tip portion is angled differentially, so for example the lumen on one side of the tip portion tapers inwardly to a different degree to thereby create a ramped internal surface, to thereby direct outflow towards a centre of the blood vessel. In one specific example, a wall on one side of the tip portion is substantially aligned with the lumen in the elongate body and the wall on an opposing side of the tip portion is angled relative to the lumen in the elongate body, and an example of this arrangement will be described in more detail below.

Additionally, the angled portion of the lumen could be straight, but this is not essential and a curved profile could alternatively be used.

Figure 4:
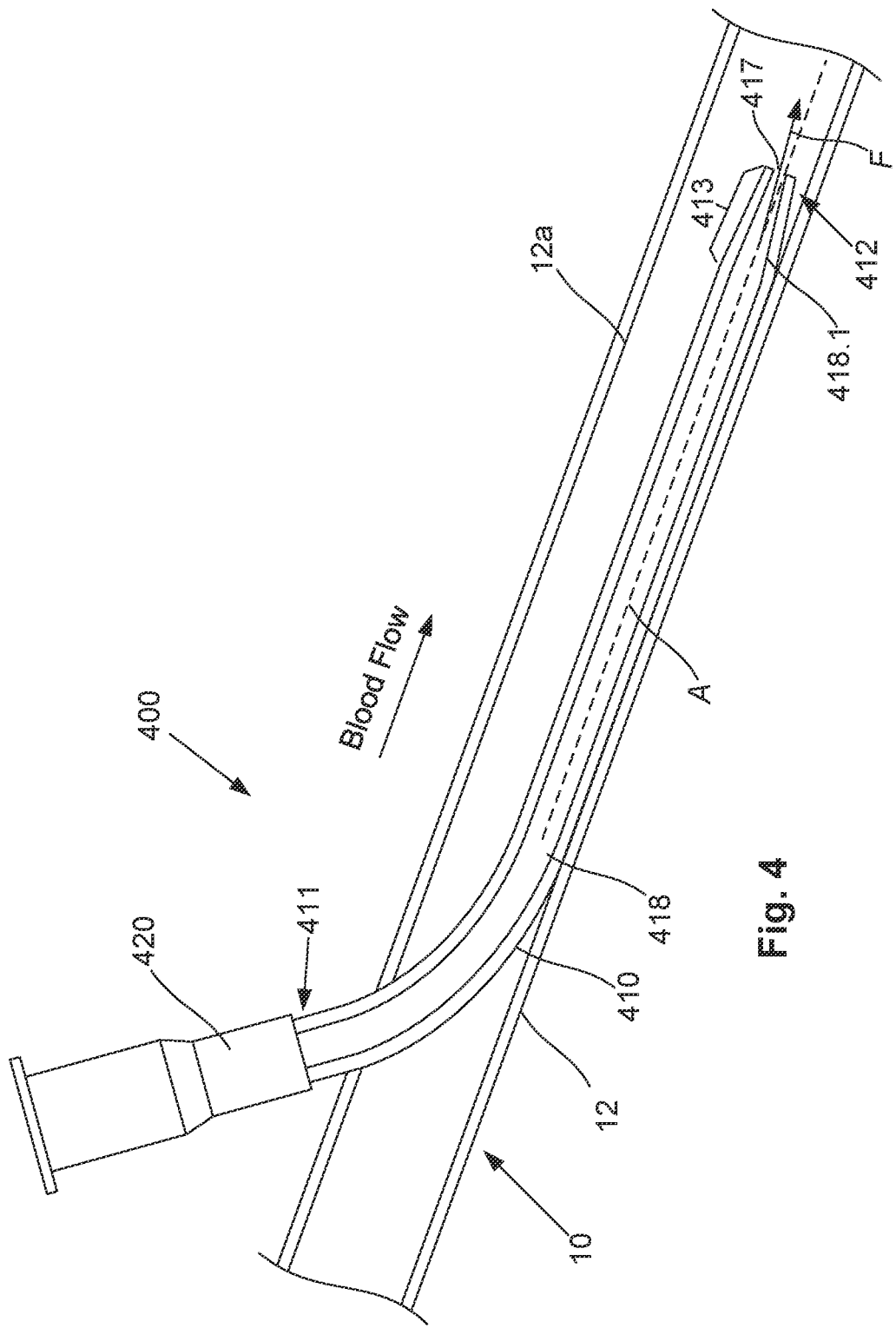
FIG. 4 is a schematic side view of a further example of a catheter inserted into a vessel and used to deliver a fluid into the bloodstream.
Figure 7D:
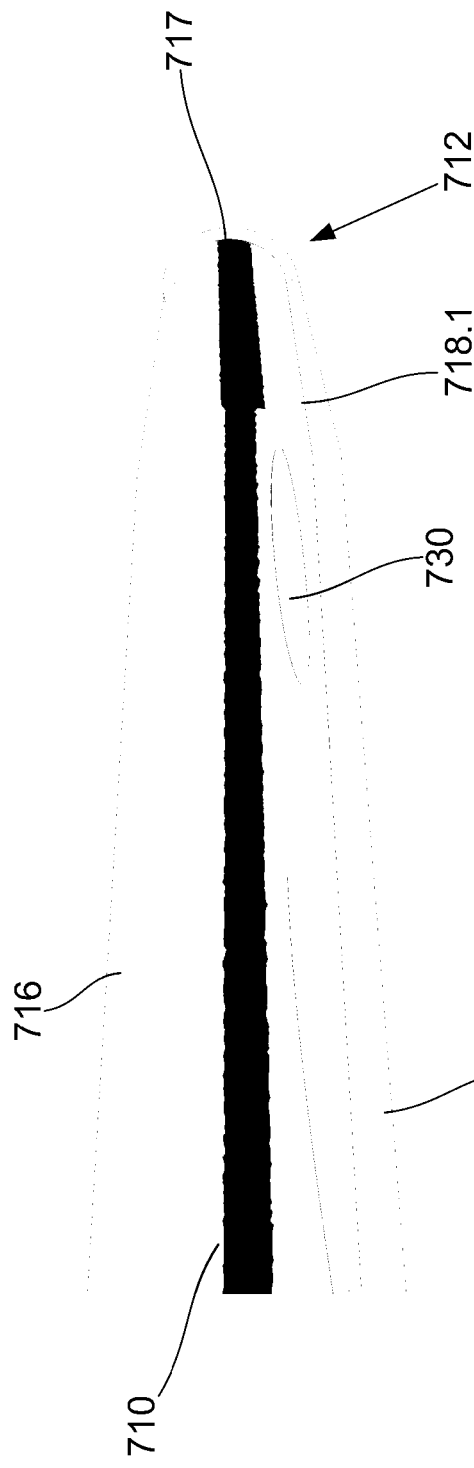
FIG. 7D is a schematic close up view of the end of the catheter of FIG. 7A.
Figure 7F:
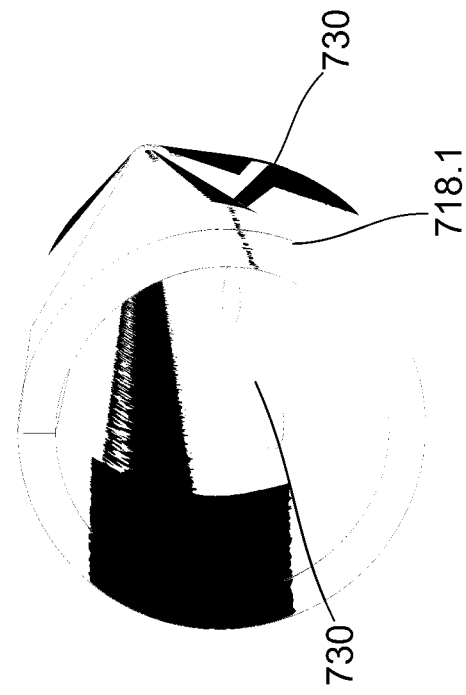
FIG. 7F is a second schematic perspective internal view of the end of the catheter of FIG. 7A.
Figure 7E:
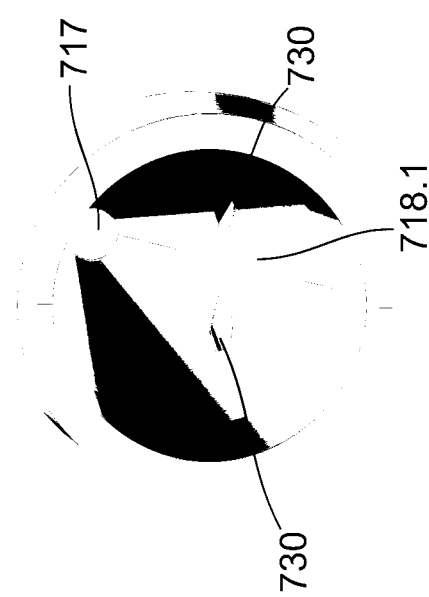
FIG. 7E is a schematic perspective internal view of the end of the catheter of FIG. 7A.

In example shown in FIG. 4, the lumen 410 in the tip region and the outer surface of the tip have a similar complementary profile, meaning the wall thickness of the catheter is similar throughout the body 410. In this instance, the tip region can have an external tapered profile that is asymmetric, at an angle offset from an axis of the catheter and/or arranged so that the outlet is offset from an axis of the catheter. However, it will be appreciated that this is not essential, and alternatively, the angling of the lumen could be achieved using changes in catheter wall thickness along the length of the catheter body 410.

In one example, the lumen in the tip portion is provided at an angle relative to the axis of the catheter that is greater than 1°, greater than 2°, greater than 5°, greater than 10°, less than 15° or less than 20°, although it will be appreciated that other angles could be used.

In another example, a catheter for insertion into a vessel of a subject includes a vessel contacting portion that is softer than other parts of the catheter.

An example of such an arrangement will now be described with reference to FIGS. 5A and 5B.

In this example, the catheter 500 includes an elongate body 510 extending between a proximal end 511 configured to be attached to a hub 520 and a distal end 512 configured to be inserted into the vessel of the subject. The body further includes a tip portion 513 at the distal end 512, the tip portion having an external tapered profile and including an outlet 517. A lumen 518 extends from the proximal end 511 to the outlet 517.

In this example, the catheter body 510 includes a vessel contacting portion 510.1 that is softer than other parts of the catheter. In this regard, the vessel contacting portion 510.1 is arranged so that this will contact the blood vessel wall 12 in preference to other parts of the catheter, which is typically achieved by making a lower half of the catheter a vessel contacting portion. This part of the catheter can be made of a different material, or material that has been treated differently and/or coated, so that the vessel contacting portion will deform upon contact with the vessel wall 12, as shown in FIG. 5B. This distributes load, and hence reduces forces and pressure, on the surface of the blood vessel which helps reduce inflammation or irritation of the walls of the vessel. Despite this, remaining parts of the catheter body 510 provide sufficient stiffness to allow the catheter to be used in the normal way, specifically to maintain an overall shape of the catheter, and to support the catheter during insertion into the blood vessel, allowing the catheter to be used in a substantially normal manner.

A further benefit of the arrangement is that there is a reduction in stagnation in the region immediately adjacent the catheter. In this regard, for a traditional circular catheter, there is a significant region where there is a small spacing between the catheter and the vessel wall. As flow in this region is reduced, this can lead to stagnation, which in turn leads to clotting, thrombosis or occlusion. In contrast, in the current arrangement the region of small spacing is minimised, in turn minimising the volume in which stagnation can occur.

A number of further features of the vessel contacting portion will now be described.

In one example, the vessel contacting portion is made of a different material to other parts of the body, which can be achieved using dual extrusion or other similar manufacturing processes. However, this is not essential, and in another example, the vessel contacting portion can be a surface layer applied to at least part of the body. In one example, the vessel contacting portion is made of polyurethane, although it will be appreciated that other suitable materials could be used.

In one example, the vessel contacting portion has a Shore hardness that is less than 50 A, less than 40 A, less than 30 A, less than 20 A, or less than 10 A. In this example, a non vessel contacting portion of the catheter body has a Shore hardness of at least one of greater than 50 A, greater than 40 A, greater than 30 A, greater than 20 A, and, greater than 10 A. It will be appreciated however that the vessel contacting material can have any range of stiffness that is lower than the non vessel contacting portion of the catheter body. In another example, a ratio of the hardness, including a material stiffness or other gross mechanical properties, such as a Young's modulus, of the non vessel contacting portion to the vessel contacting portion is greater than 0.01:1, greater than 0.05:1, greater than 0.1:1 or greater than 0.5:1.

Typically the vessel contacting portion is provided on an underside of the body at least rearwardly of, and optionally extending into the tip portion. In one particular example, the catheter body 510 includes a first portion 514 that extends a first length from the proximal end 511 and a second portion 516 that extends a second length from an end of the first portion 514 to the tip portion 513, with the vessel contacting portion 510.1 being provided in the second portion 516.

It will be appreciated that the above described angled lumen and vessel contacting portion could be used in conjunction, optionally together with openings as previously described. An example of such an arrangement is shown in FIG. 6.

In this example, the catheter 600 includes an elongate body 610 extending between a proximal end (not shown) and a distal end 612. The body includes a tip portion 613 at the distal end 612, the tip portion having an external tapered profile and including an outlet 617. A lumen 618 extends from the proximal end to the outlet 617.

In this example, only a second portion 616 of the catheter body is shown, with this extending from an end of a first portion (not shown) to the tip portion 613. A vessel contacting portion 610.1 is provided on an underside of the second portion 616, whilst the lumen 618 includes an angled ramp 618.1, which in this example extends through both the second and tip portions 616, 613. As also shown, an opening 630 is provided in the second portion 616, allowing for inflow and/or outflow though the sidewall of the catheter body 610. Although only a single opening is shown, it will be appreciated that a plurality of openings might be provided, and the single opening is for illustrative purposes only.

It will therefore be appreciated that the above described arrangement provides a combination of benefits previously described for the individual concepts. However, in this example, openings 630 are not used for centralising the catheter within the blood vessel, but rather are to facilitate flow and prevent blood stagnation and clotting.

A number of further features will now be described.

In one example, the second portion is configured to be entirely contained within the blood vessel, whilst the first portion typically extends into the blood vessel only a minimal length. This ensures that parts of the catheter not including a vessel contacting portion do not come into contact with the blood vessel internal wall. In one example, the second portion has a length that is at least one of at least 30% of the catheter length, at least 40% of the catheter length, at least 50% of the catheter length, at least 60% of the catheter length and at least 65% of the catheter length.

In one example, the opening 630 is provided on a side of the body containing the vessel contacting portion 610.1, and optionally may form part of the vessel contacting portion 610.1. Positioning the opening 630 near or in the vessel contacting portion 610.1 allows the opening to be configured to cause fluid exiting the opening 630 to enter a region between the vessel and the vessel contacting portion, which can assist in cushioning the vessel wall and/or preventing stagnation of blood flow in a region adjacent the catheter.

However, this is not essential, and alternatively the opening can be provided on a side of the body opposing a side containing the vessel contacting portion, for example to direct flow away from the vessel wall and/or towards a centre of the vessel.

The openings can also be opened to direct fluid exiting the catheter via the opening in a direction roughly parallel to the direction of blood flow within the blood vessel, which also reduces flow agitation of the blood vessel.

In one example, the opening 630 is provided rearwardly of the tip portion 613 and optionally in the second portion 616 of the catheter body 610. As will be described in more detail below, in one example, the opening is a self-occluding opening, operable between a resting-closed position and a forced-open position.

When lateral openings 630 are provided, the tip tapers to a narrower distal end, so that the lumen also tapers, thereby maintaining a pressure in the lumen to encourage flow via the lateral openings. In one example, the narrow distal end has a diameter that is less than 90% of a diameter of the body, less than 80% of a diameter of the body, less than 50% of a diameter of the body, between 40% to 10% of a diameter of the body, approximately 30% of a diameter of the body, or approximately 20% of a diameter of the body, although other sizes could be used depending on the preferred implementation.

In a further example, the outlet 617 could also be self closing, which can be used to promote increased flow via the lateral openings 630. In this regard, the outlet 617 could be configured to remain closed until a higher pressure is achieved in the lumen, so that the lateral openings open in preference to the outlet 617. In another example, the outlet might be configured to only open to allow insertion of a guidewire or needle, so that all outflow is via the lateral openings, and with the outlet 617 only be used to facilitate insertion of the catheter.

In one example, the plurality of self-occluding openings cross-shaped slits, U-shaped slits, V-shaped slits, I-shaped slits, curved slits, or other suitable shaped or configured slits.

The second portion of the catheter is typically made of one or more of a flexible material, silicone, fluorinated ethylene propylene (FEP), polytetrafluoroethene (PTFE), and/or polyurethane, depending on the properties desired and in particular whether this is to act as a vessel contacting portion.

In one example, the plurality of self-occluding openings are in a forced-open position either when an internal pressure is larger than an external pressure or when an external pressure is larger than an internal pressure.

In the above examples, the catheter can include features configured to assist orientation of the catheter within the vessel. Specifically this can be used to ensure the catheter is orientated within the vessel so that the vessel contacting portion is in contact with the blood vessel (as opposed to other parts of the catheter body) and/or to ensure the angled lumen directs fluid away from the blood vessel wall.

In one example, the catheter is coupled to a hub and the features are used to control an orientation of the catheter relative to a hub, for example by having a coupling mechanism that engages the hub with the catheter in a specific orientation, so that the hub can then be used to orientate the catheter within the blood vessel.

In another example, the features can include visual markings provided proximate a proximal end and/or on the first portion. In this instance, the visual markings can indicate a side of the catheter that should contact the vessel, a side of the catheter that should face away from the vessel, a position of the vessel contacting portion or a direction of the angle of the lumen. In this instance, it will be appreciated that visual inspection of the catheter prior to or following insertion, can be used to ensure the catheter is correctly positioned.

A further specific example of a catheter will now be described with reference to FIGS. 7A to 7F.

In this example, the catheter includes an elongate body 710 extending between a proximal end (not shown) and a distal end 712. The body includes a tip portion 713 at the distal end 712, the tip portion having an external tapered profile and including an outlet 717. A lumen extends from the proximal end to the outlet 717.

In this example, only a second portion 716 of the catheter body is shown, with this extending from an end of a first portion (not shown) to the tip portion 713. A vessel contacting portion 710.1 is provided on an underside of the second portion 717, whilst the lumen includes an angled ramp 718.1, which in this example extends through the tip portion 713 and optionally through some or all of the second portion.

As also shown, openings 730 are provided in the second portion 716, allowing for inflow and/or outflow though the sidewall of the catheter body 710, with the openings being angled to direct flow along the blood vessel, approximately parallel to the direction of blood flow.

Operation of this arrangement will now be described in more detail with reference to FIGS. 8 and 9.

In this regard, susceptibility to thrombosis typically arises as a result of three considerations, namely blood stasis, endothelial injury and hypercoagulability. Blood stasis is the slow moving stagnant blood and is caused by the cannula obstructing blood and causing zones of recirculating blood flow (i.e. stagnant). Endothelial injury is caused by the frictional force of the cannula rubbing on the important endothelial cells that line the vein and the force of the infused saline, whilst hypercoagulability is a patient-specific factor related to the person's blood and other aspects that may make their blood more likely to clot.

The above described catheter is specifically arranged to address blood stasis and endothelial injury, in particular by preventing stagnation, and reducing the effect of contact between the catheter and blood vessel, and outflow of fluid into the blood vessel.

In this regard, the angled lumen 718.1 directs fluid, such as saline into moving blood flow, thereby reducing the impact of flow on the blood vessel wall, whilst the vessel contacting portion created from a softer material allows the device to conform to the blood vessel and hence both reduces the forces on the blood vessel and also reduces the area underneath traditional circular cross-section catheters that may promote stagnation.

In use, the device is typically used during either TKVO (to keep vein open) or flushing.

Figure 8A:
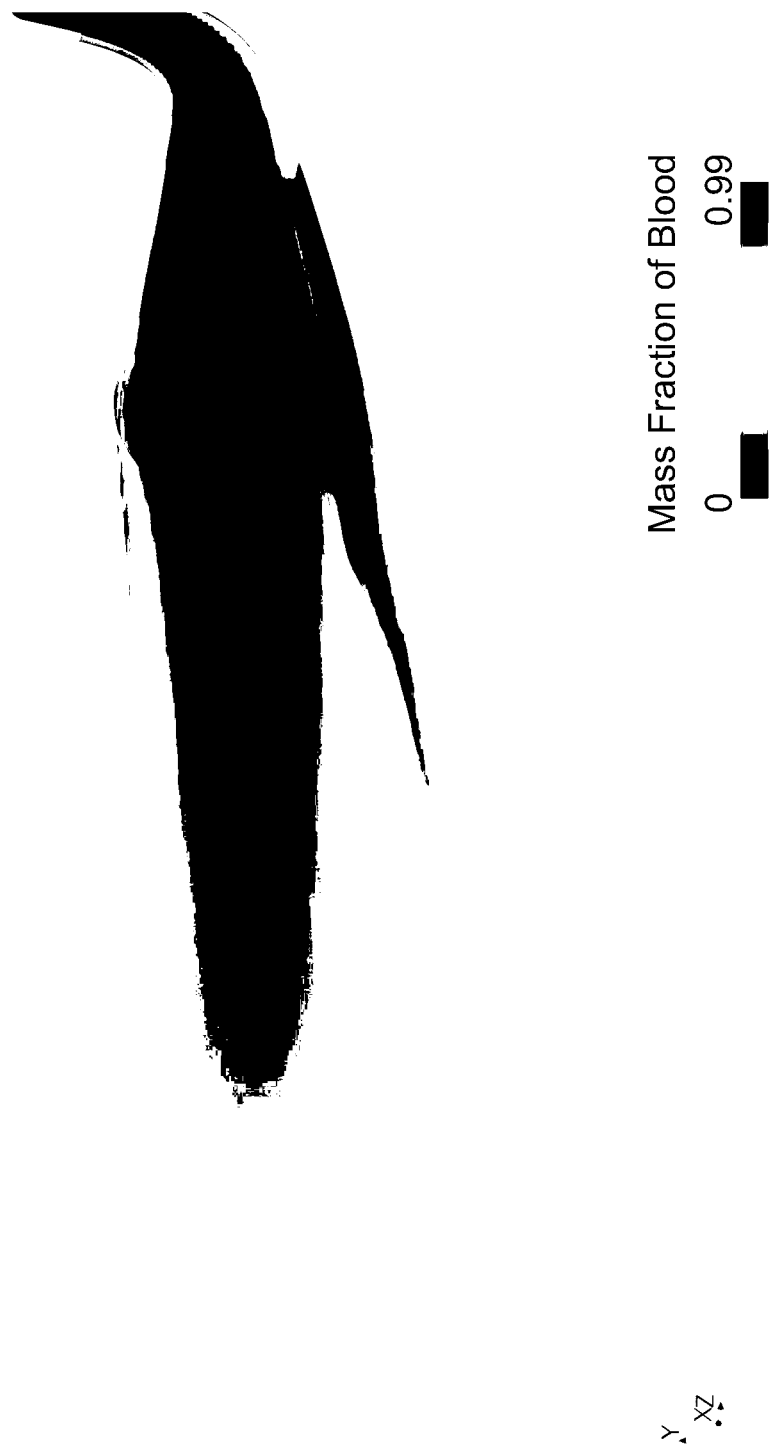
FIG. 8A is a schematic diagram illustrating an example of keep vein open fluid flow for the catheter of FIG. 7A.

TKVO is common practice worldwide and involves using continuous infusion of saline to 'keep the vein open' so that that cannula does not clot. The TKVO rate is 5-50 ml/h and in some traditional catheter is not sufficient to maintain a 'clear tip'—i.e. good flow of saline out of the tip. In contrast, the above described catheter of FIGS. 7A to 7F works well at 40 ml/h, and example of the flow is as shown in FIG. 8A, which highlights sufficient flow of fluid via the outlet 717 and openings 730 to ensure blood moves around the cannula and reduces the amount of stagnant blood.

Figure 8B:
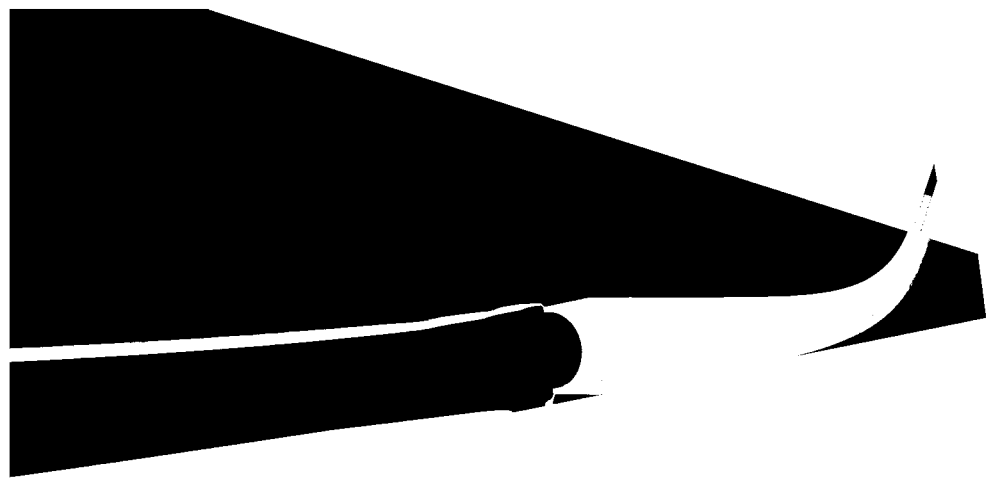
FIG. 8B is a schematic diagram illustrating an example of saline diffusion during keep vein open fluid flow for a traditional catheter.
Figure 8C:
FIG. 8C is a schematic diagram illustrating an example of saline diffusion during keep vein open fluid flow for the catheter of FIG. 7A.

FIGS. 8B and 8C show comparison of outflow from a traditional catheter and the above described catheter of FIGS. 7A to 7F. In this example, the catheter of FIGS. 7A to 7F results in similar diffusion of saline at TKVO but the outflow stream is angled upwards from the angled lumen 718.1 reduce disturbance of the blood vessel.

Figure 8D:
FIG. 8D is a schematic diagram illustrating an example of blood flow around a traditional catheter during keep vein open fluid flow.
Figure 8E:
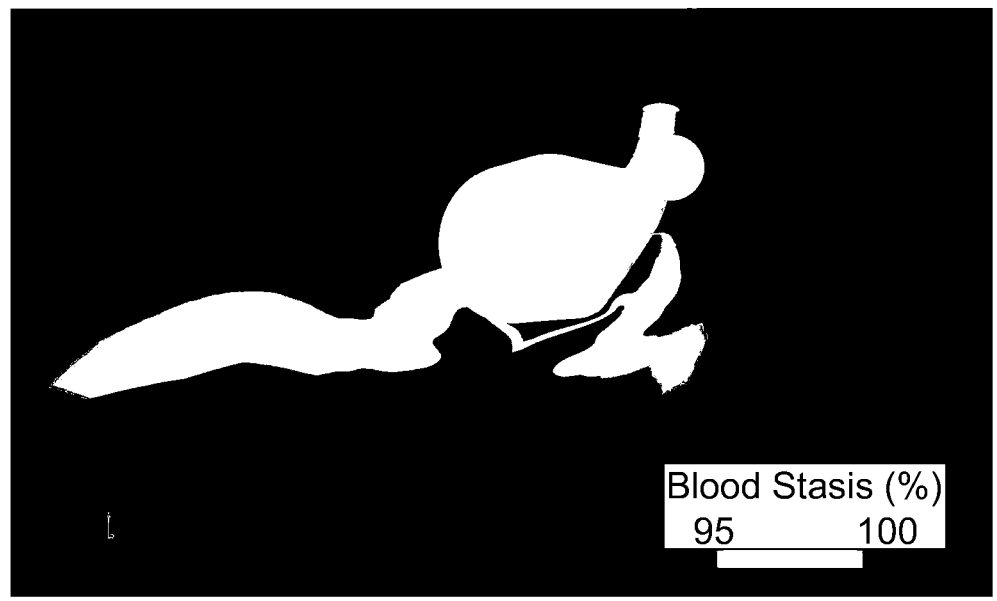
FIG. 8E is a schematic diagram illustrating an example of blood flow around the catheter of FIG. 7A during keep vein open fluid flow.

FIGS. 8D and 8E show comparison of blood flow around a traditional catheter and the above described catheter of FIGS. 7A to 7F. In this example, the catheter of FIGS. 7A to 7F results in improved flow around the catheter and reduce stagnation, through a combination of increased contact surface area between the catheter and blood vessel (which reduces the area in which stagnation can occur) and outflow via the openings 730, which encourage blood flow.

Despite these benefits, there are no major impacts on high or low shear stresses, meaning there are no significant drawbacks for the catheter of FIGS. 7A to 7F.

Flushing is the practice of infusing amounts of saline (e.g. 3-10 ml) at regular intervals throughout the day to clear the cannula of blood, which is a common practice worldwide and is included in clinical guidelines. There are no stated infusion rates to follow but generally speaking a 5 ml syringe may be used and the 5 ml will be infused over several seconds. However this infusion rate can influence fluid dynamics and thus the shear stress and endothelial injury.

Figure 9A:
FIG. 9A is a schematic diagram illustrating an example of flushing fluid flow for the catheter of FIG. 7A.

Flushing was modelled using a flush rate of 1 ml/s which is often used in scientific literature and an example of the resulting flow for the catheter of FIGS. 7A to 7F is as shown in FIG. 9A.

Figure 9B:
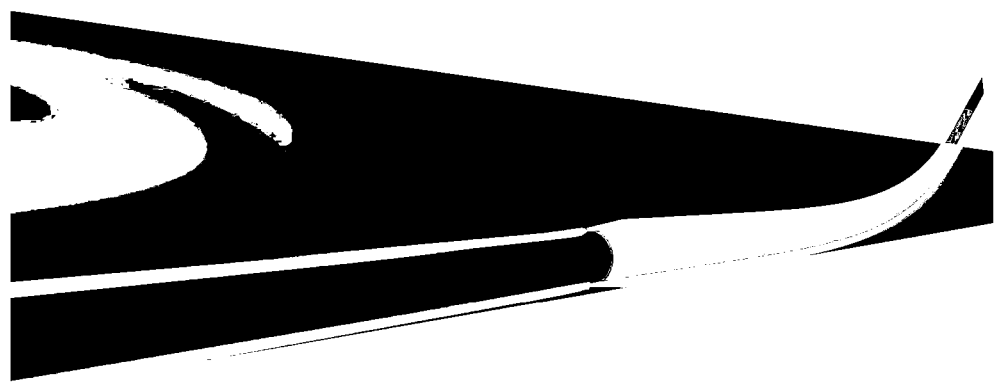
FIG. 9B is a schematic diagram illustrating an example of saline diffusion during flushing fluid flow for a traditional catheter.
Figure 9C:
FIG. 9C is a schematic diagram illustrating an example of saline diffusion during flushing fluid flow for the catheter of FIG. 7A.

FIGS. 9B and 9C show comparison of diffusion of saline from a traditional catheter and the above described catheter of FIGS. 7A to 7F. In this example, the catheter of FIGS. 7A to 7F results in similar diffusion of saline during flush, but with the flow angled upwards from the angled lumen 718.1 to reduce disturbance of the blood vessel.

Figure 9D:
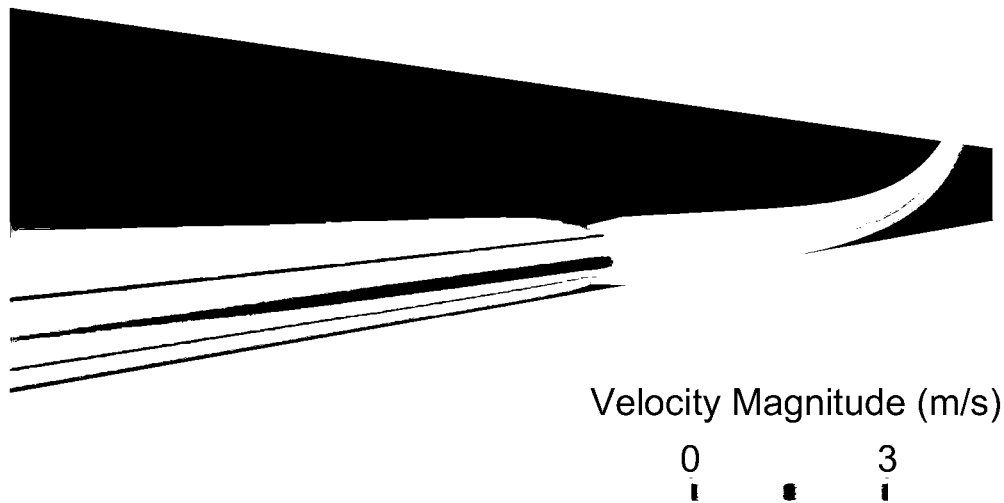
FIG. 9D is a schematic diagram illustrating an example of fluid velocity during flushing fluid flow for a traditional catheter.
Figure 9E:
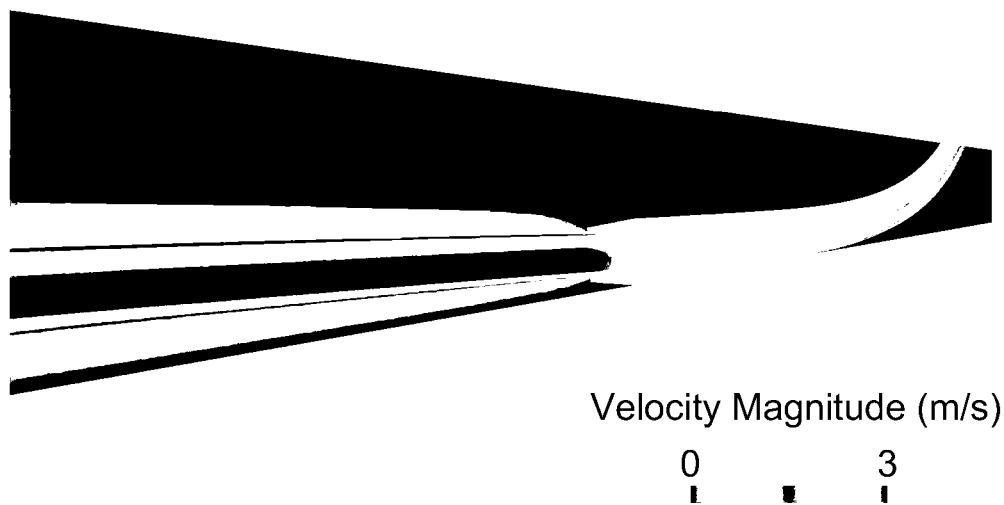
FIG. 9E is a schematic diagram illustrating an example of fluid velocity during flushing fluid flow for the catheter of FIG. 7A.

FIGS. 9D and 9E show comparison of flow velocity during flush from a traditional catheter and the above described catheter of FIGS. 7A to 7F. In this example, the catheter of FIGS. 7A to 7F results in an increased flow velocity due to the reduced outflow diameter compared to traditional catheters, but with the angle preventing disruption of the blood vessel wall.

Figure 9F:
FIG. 9F is a schematic diagram illustrating an example of shear stress during flushing fluid flow for a traditional catheter.
Figure 9G:
FIG. 9G is a schematic diagram illustrating an example of shear stress during flushing fluid flow for the catheter of FIG. 7A.

FIGS. 9F and 9G show comparison of shear stress during flush for a traditional catheter and the above described catheter of FIGS. 7A to 7F. In this example, the catheter of FIGS. 7A to 7F results in a significant decrease in wall shear stress, thereby reducing inflammation and irritation of the blood vessel. For instance, in the catheters of FIGS. 7A to 7F, the shear stress on the vessel wall near the tip region is reduced by 50% compared to traditional catheters (FIGS. 9F and 9G).

When flushing is performed, the cannula will be used with either TKVO or zero infusion post-flush. If zero infusion is used, blood creeps back into the cannula after the flush. The catheter of FIGS. 7A to 7F changes the profile of blood flowing around the device and leads to lower amounts of stasis around the cannula regardless of TKVO or zero infusion, but with zero infusion blood can flow into the cannula and the holes allow more blood to enter.

Accordingly, it will be appreciated that this results in an improved catheter which reduces issues associated with vessel inflammation and blood stagnation.

Figure 10:
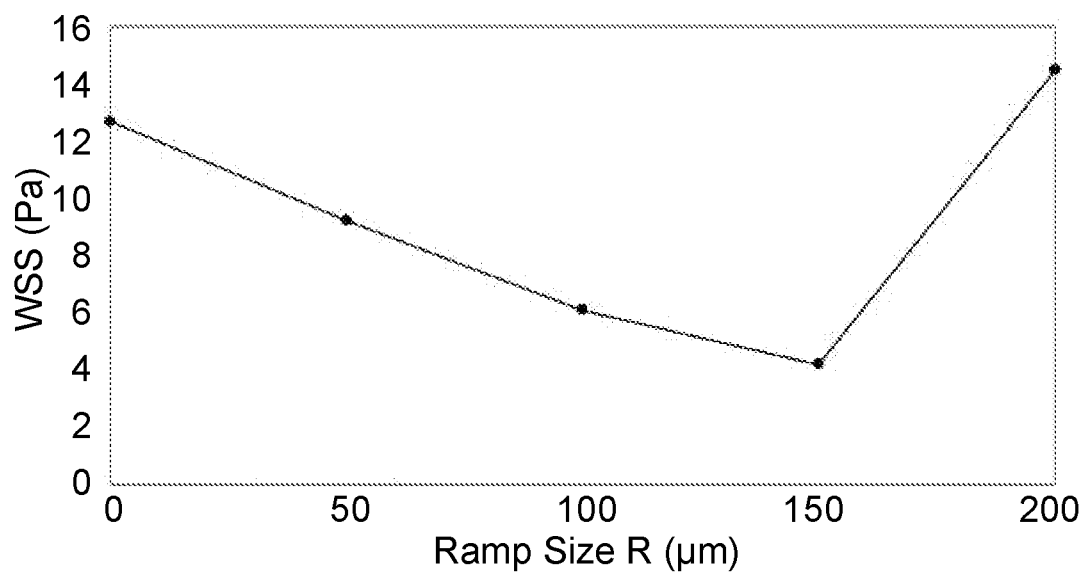
FIG. 10 is a graph illustrating a relationship between a ramp size and shear stress within a blood vessel.
Figure 11:
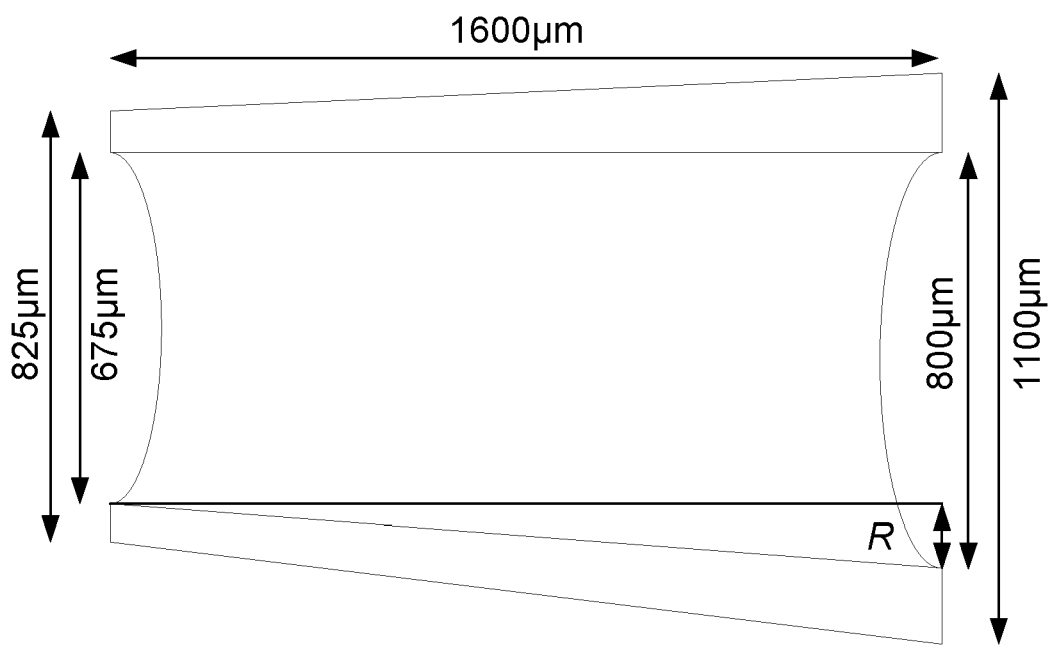
FIG. 11 is a schematic side view of an example of a catheter tip for insertion into a vessel of a patient.

Further testing was performed in order to assess ideal angles of the internal tapering of the lumen wall in the tip, and results of modeling are shown in FIG. 10. This was performed for the tip arrangement shown in FIG. 11.

In this example, the tip includes an upper wall that is aligned with the lumen in the elongate portion of the catheter. The tip has a length of 1600 μm, compared to an overall catheter length of 32,000 μm, although it will be appreciated that these values are for the purpose of example, and that in practice different lengths might be used, for example depending on the preferred implementation and/or intended usage. The main elongate body of the catheter also has a lumen diameter of 800 μm and an outer diameter of 1,100 μm. Different ramp heights R were trialed, as shown in FIG. 10, with an optimum ramp height of 125 μm being selected, leading to a ramp angle of about 4.5°. Based on these dimensions, this leads to the lumen having an outlet diameter of 675 μm and the tip including an external outlet diameter of 825 μm. This arrangement achieves a 60% reduction in shear stress compared to a control PIVC (12.7 v 5.1 Pa) and effectively directs the infused fluid away from the vein wall and into the flowing venous blood.

As previously described, the catheter can be used in conjunction with openings, and further examples of these will now be described in more detail.

A further example of a catheter 1200 for insertion into a vessel of a patient will now be described with reference to FIG. 12.

In the example of FIG. 12, the catheter 1200 includes an elongate body 1210 that extends from a proximate end 1211 connectable to a hub 220 to a distal end 1212 at a tip portion 1213 thereof, in which a fluid outlet may also be provided. The body 1210 includes a first portion 1214 that is an enclosed section and a second portion 1216 that defines an at least partially open section having a plurality of openings 1230 in a circumferential wall portion thereof.

As per the previous examples, the length of the first portion 1214 is approximately two thirds of the total length of the body 1210 whilst a combined length of the tip portion 1213 and the second portion 1216 is approximately a third of the total length of the body 1210, although the ratio of these lengths may vary depending on the intended use of the catheter 1200.

In this case, the openings 1230 are defined as round holes, although it should be understood that any suitable shape of openings 1230 may be used. The plurality of openings 1230 may be arranged in an array or any other repeating pattern with regular spacing between adjacent openings. The openings 1230 may have different sizes depending on their positioning on the catheter. In particular, in this example, plurality of openings 1230 includes a first arrangement of relatively larger holes across a first side of the second portion 1216 and a second arrangement of relatively smaller holes on an opposing second side of the second portion 1216.

In use, the catheter 1200 may be inserted into a vessel of a patient so that the first side having the relatively larger holes will be oriented upwardly and the second side having the relatively smaller holes will be oriented downwardly. In this manner, the different sizes of the holes may be used to account for variations in flow through the first and seconds sides under the influence of gravity. For instance, greater flow may be expected through the downwardly oriented (i.e. bottom) side of the inserted catheter 1200 compared to the upwardly oriented (i.e. top) side of the inserted catheter 1200, which could result in uneven flow around the circumference of the inserted catheter 1200 such that the inserted catheter 1200 may not be properly centralized within the vessel. However, this effect can be offset by the use of smaller holes on the bottom and large holes on the top of the inserted catheter 1200 to thereby change the relative flow proportions and thus assist in proper centralization of the inserted catheter 1200 within the vessel, although as previously mentioned, centralisation might not be required.

In some embodiments, the diameters of the holes on the first side of the second portion 1216 may be 1.5 to 2 times the diameters of the holes on the second side of the second portion 1216. In one particular implementation using a standard 20 G catheter size (having an outer diameter of about 1.1 mm and inner diameter of about 0.9 mm), the larger holes on the first side of the second portion 1216 may have a diameter of about 0.4 mm whilst the smaller holes on the second side of the second portion 1216 may have a diameter of about 0.25 mm. It should be understood that the sizes of the holes may vary depending on the gauge of the catheter 1200 and on the particular application.

In some examples more than two different sizes of holes may be used and arranged so that the holes progressively transition in size from the first side to the second side. These arrangements of different sized holes may have the same or different spacing between adjacent holes. It should be appreciated that similar variations in sizes may be applied to the configuration of openings arranged in a matrix or web-like formation as per previous examples.

As per the previous example, the second portion 1216 terminates at the start of the tip portion 1213 which is solid and narrowly tapered. The inner and outer circumferential wall of the first portion 1214 is micro-textured or roughened (denoted by cross-hatching), along with the solid tip portion 1213.

A seventh example of a catheter 1300 for insertion into a vessel of a patient will now be described with reference to FIG. 13.

In the example of FIG. 13, the catheter 1300 includes an elongate body 1310 that extends from a proximate end 1311 connectable to a hub 220 to a distal end 1312 at a tip portion 1313 thereof, in which a fluid outlet may also be provided. The body 1310 includes a first portion 1314 that is an enclosed section and a second portion 1316 that defines a section having a plurality of self-occluding openings 1330 in a circumferential wall portion thereof.

As per the previous example, the length of the first portion 1314 is approximately two thirds of the total length of the body 1310 whilst a combined length of the tip portion 1313 and the second portion 1316 is approximately a third of the total length of the body 1310, although the ratio of these lengths may vary depending on the intended use of the catheter 1300.

In this example, the second portion 1316 is of a flexible material, such as silicone or polyurethane. The second portion 1316 is terminates at the start of the tip portion 1313, and hence positioned rearwardly from the tip portion 1313 which is tapered.

In this case, the self-occluding openings 1330 are defined as slits, although it should be understood that any suitable shape of self-occluding openings 1330 may be used. The plurality of self-occluding openings 1330 may be arranged in an array or any other repeating pattern with regular spacing between adjacent openings. The self-occluding openings 1330 may have different sizes depending on their positioning on the catheter. In particular, in this example, the plurality of self-occluding openings 1330 includes a plurality of cross-shaped slits. The self-occluding openings 1330 have a resting-closed position and a forced-open position.

In use, fluid exits the catheter 1300 through the plurality of self-occluding openings 1330 in addition to the fluid outlet in the tip portion 1313. In this example, a diameter of the fluid outlet in the tip portion is smaller than the internal diameter of the body 1310 and/or the second portion 1316. The smaller outlet results in an increased internal pressure of the catheter and creates a larger internal pressure than an external pressure of the catheter 1300. Thereby fluid forces the plurality of self-occluding openings 1330 open and exits the catheter 1300.

Similarly, in an example of aspiration, fluid forces the plurality of self-occluding openings 1330 open and enters the catheter 1300, when an external pressure is larger than an internal pressure of the catheter 1300.

In an example, the diameter of the fluid outlet in the tip portion may be less than 50% of the diameter of the body. More particularly, it may be between 40% and 10% of the diameter of the body. In an example, the diameter of the fluid outlet in the tip portion is approximately 30% of the diameter of the body. In another example, the diameter of the fluid outlet in the tip portion is approximately 20% of the diameter of the body. In one particular implementation using a standard 20 G catheter size (having an outer diameter of about 1.1 mm and inner diameter of about 0.9 mm), the fluid outlet in the tip portion may have a diameter of between 0.1 mm and 0.4 mm, or about 0.2 mm, or about 0.3 mm. In an example, the body of the catheter has a diameter between 0.4 mm to 2 mm and the self-occluding opening is forced to open and opening with a diameter between 0.01 mm and 1.0 mm, or between 0.05 mm and 0.5 mm, or between 0.11 mm to 0.2 mm.

An eighth example of a catheter 1400 for insertion into a vessel of a patient will now be described with reference to FIGS. 14A to 14E. It will be appreciated that the examples of FIGS. 14A to 14E are generally similar to the example of FIG. 13, but for differences in the particular arrangements of the respective second portions. In the example of FIGS. 14A to 14E, the plurality of self-occluding openings 1430 includes a plurality of U-shaped or V-shaped slits. It should be appreciated that other orientations of the U-shaped or V-shaped slits may also be suitable.

A ninth example of a catheter 1500 for insertion into a vessel of a patient will now be described with reference to FIG. 15. It will be appreciated that the example of FIG. 15 is generally similar to the example of FIG. 13, but for differences in the particular arrangements of the respective second portions. In the example of FIG. 15, the plurality of self-occluding openings 1530 includes a plurality of I-shaped slits.

A tenth example of a catheter 1600 for insertion into a vessel of a patient will now be described with reference to FIG. 16. It will be appreciated that the example of FIG. 16 is generally similar to the example of FIG. 13, but for differences in the particular arrangements of the respective second portions. In the example of FIG. 16, the plurality of self-occluding openings 1630 includes a plurality of curved slits.

It should be appreciated that the plurality of self-occluding openings can be of form of different sizes and shapes. In an example of FIG. 17, a catheter 1700 has a mixture of U-shaped slits and curved slits in variable sizes to form the plurality of self-occluding openings 1730. It should also be appreciated that the self-occluding openings can be arranged in rows-and-columns or scattered randomly in the second portion.

The above described arrangements provide a number of advantages.

By providing a plurality of self-occluding openings in the circumferential wall in a portion of the catheter, thrombotic occlusion at the tip of the catheter is eliminated due to the plurality of alternative fluid entry/exit points in the body of the catheter in addition to the fluid outlet at the tip. In the above described arrangements, the self-occluding openings are at resting-closed positions when there is no fluid/IV medication or blood products being infused or when used at TKVO rates as the internal pressure will not be great enough to overcome the external pressure. This prevents formation of blood components or micro-thrombi on un-covered openings causing occlusion in the second portion.

It should be understood that the features described above may be applied to catheters having various catheter gauge sizes and lengths and the sizing and proportions of particularly features may be selected based on the size of any given catheter and with regard to the intended use of the catheter. For instance, the second portion including the plurality of openings may be longer or shorter than indicated in the previous examples if required, whilst the size of the openings and the diameter of the fluid outlet in the tip portion may be varied depending on the catheter gauge size and other requirements.

It should also be understood that features depicted in the Figures are not necessarily shown to scale. For example, the relative sizes of particular features may be enlarged or reduced for the sake of improved understanding. Similarly, features may be represented in the Figures using simplified shapes or indicated using shading or the like to avoid unnecessarily complicating the views.

Accordingly, it will be appreciated that in at least one example the above described PIVC, midline or arterial catheter may eliminate or reduce catheter 'drag', occlusion, phlebitis, infiltration, biofilm adherence, shear stress, outflow resistance and fibrin deposition.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A catheter or cannula for insertion into a vessel of a subject, the catheter or cannula including:
   a) an elongate body extending between a proximal end configured to be attached to a hub and a distal end configured to be inserted into the vessel of the subject, the body having:
   b) a tip portion at the distal end, the tip portion having an external tapered profile and including an outlet; and,
   c) a lumen extending from the proximal end to the outlet, wherein the lumen is angled asymmetrically in the tip portion so that the lumen narrows towards the outlet and to direct flow from the outlet at an angle offset from an axis of the catheter or cannula so fluid is directed towards the centre of the blood vessel,
   wherein a wall on one side of the tip portion is substantially aligned with the lumen in the elongate body and the wall on an opposing side of the tip portion is angled relative to the lumen in the elongate body, thereby angling the lumen asymmetrically in the tip portion, and wherein the wall on one side of the tip portion and the wall on the opposing side of the tip portion terminate at a substantially similar point with respect to the axis of the catheter; wherein the catheter is a peripheral catheter that is configured to be peripherally inserted into a peripheral vessel of a patient, and wherein the body of the catheter has a diameter between 0.4 mm to 2 mm.

2. A catheter or cannula according to claim 1, wherein the lumen is angled with a curved profile.

3. A catheter or cannula according to claim 1, wherein at least one of:
   a) the lumen in the tip portion is provided at an angle relative to the axis of the catheter or cannula that is at least one of:
      i) greater than 1°;
      ii) greater than 2°;
      iii) greater than 5°;
      iv) greater than 10°;
      v) less than 15°; and,
      vi) less than 20°; and,
   b) at least part of a wall of the lumen in the tip portion is provided at an angle relative to the axis of the catheter or cannula that is at least one of:
      i) greater than 1°;
      ii) greater than 2°;
      iii) about 4.5°; and,
      iv) less than 10°.

4. A catheter or cannula according to claim 1, wherein the external tapered profile is at least one of:
   a) asymmetric;
   b) at an angle offset from an axis of the catheter or cannula; and,
   c) so that the outlet is offset from the axis of the catheter or cannula.

5. A catheter or cannula according to claim 1, wherein at least part of the body includes a vessel contacting portion that is softer than other parts of the catheter or cannula and wherein at least one of:
   a) the vessel contacting portion is configured to at least one of:
      i) at least partially deform upon contact with the vessel; and,
      ii) distribute load across a surface of the vessel;
   b) the vessel contacting portion is at least one of:
      (1) made of a different material to other parts of the body; and,
      (2) a surface layer applied to at least part of the body;
   c) the vessel contacting portion is made of polyurethane;
   d) the vessel contacting portion has a Shore hardness of at least one of:
      i) less than 50 A;
      ii) less than 40 A;
      iii) less than 30 A;
      iv) less than 20 A; and,
      v) less than 10 A;
   e) a non vessel contacting portion has a Shore hardness of at least one of:
      i) greater than 50 A;
      ii) greater than 40 A;
      iii) greater than 30 A;
      iv) greater than 20 A; and,
      v) greater than 10 A;
   f) a ratio of the hardness of the non vessel contacting portion to the vessel contacting portion is at least one of:
      i) greater than 0.01:1;
      ii) greater than 0.05:1;
      iii) greater than 0.1:1; and
      iv) greater than 0.5:1; and,
   g) the vessel contacting portion is provided at least one of:
      i) on an underside of the body; and,
      ii) rearwardly of the tip portion.

6. A catheter or cannula according to claim 1, wherein the body includes:
   a) a first portion that extends a first length from the proximal end;
   b) a second portion that extends a second length from an end of the first portion to the tip portion, and wherein the second portion includes a vessel contacting portion.

7. A catheter or cannula according to claim 6, wherein the second portion has a length that is at least one of:
   a) at least 30% of the catheter or cannula length;
   b) at least 40% of the catheter or cannula length;

c) at least 50% of the catheter or cannula length;
d) at least 60% of the catheter or cannula length; and,
e) at least 65% of the catheter or cannula length.

8. A catheter or cannula according to claim 1, wherein the body includes at least one opening extending through the body, wherein the at least one opening is configured to permit fluid flow into or out of the body.

9. A catheter or cannula according to claim 8, wherein the at least one opening is provided on a side of the body containing a vessel contacting portion and wherein the at least one opening is configured to cause fluid exiting the at least one opening to enter a region between the vessel and the vessel contacting portion to thereby at least one of:
   a) assist in cushioning the vessel wall; and
   b) reduce stagnation of blood flow in a region adjacent the catheter or cannula.

10. A catheter or cannula according to claim 8, wherein the at least one opening is configured to at least one of:
   a) cause fluid exiting the at least one opening to be directed at least one of:
      i) towards a centre of the vessel; and,
      ii) away from a vessel wall; and,
   b) direct fluid exiting the catheter or cannula via the opening in a direction substantially parallel to a direction of blood flow within the blood vessel.

11. A catheter or cannula according to claim 8, wherein the at least one opening is provided rearwardly of the tip portion.

12. A catheter or cannula according to claim 8, wherein the at least one opening is a self-occluding opening, operable between a resting-closed position and a forced-open position.

13. The catheter or cannula according to claim 12, wherein the at least one opening is a plurality of self-occluding openings, and wherein the plurality of self-occluding openings are each at least one of:
   a) cross-shaped slits;
   b) U-shaped slits;
   c) I-shaped slits;
   d) curved slits; and,
   e) in a forced-open position when at least one of:
      i) an internal pressure is larger than an external pressure; and,
      ii) an external pressure is larger than an internal pressure.

14. A catheter or cannula according to claim 1, wherein the body includes:
   a) a first portion that extends a first length from the proximal end;
   b) a second portion that extends a second length from an end of the first portion to the tip portion, and wherein the second portion is configured to be wholly positioned within the vessel in use and includes at least one opening extending through the body.

15. The catheter or cannula according to claim 1, wherein the catheter or cannula body is made of at least one of:
   a) a flexible material;
   b) fluorinated ethylene propylene (FEP);
   c) polytetrafluoroethene (PTFE);
   d) silicone; and,
   e) polyurethane.

16. The catheter or cannula according to claim 1, wherein the tip tapers to a narrower distal end.

17. The catheter or cannula according to claim 16, wherein the narrow distal end has a diameter that is at least one of:
   a) less than 90% of a diameter of the body;
   b) less than 80% of a diameter of the body;
   c) less than 50% of a diameter of the body;
   d) between 40% to 10% of a diameter of the body;
   e) approximately 30% of a diameter of the body; and,
   f) approximately 20% of a diameter of the body.

18. A catheter or cannula according to claim 1, wherein the catheter or cannula includes features to assist in orientation of the catheter or cannula within the vessel.

19. A catheter or cannula according to claim 18, wherein a proximal end of the catheter or cannula is coupled to the hub and the features are used to control an orientation of the catheter or cannula relative to the hub.

20. A catheter or cannula according to claim 19, wherein the features include visual markings at least one of:
   a) provided proximate the proximal end; and,
   b) provided on the first portion, wherein the visual markings are indicative of at least one of:
      i) a side of the catheter or cannula that should contact the vessel;
      ii) a side of the catheter or cannula that should face away from the vessel;
      iii) a position of the vessel contacting portion;
      iv) a direction of the angle of the lumen.

* * * * *